United States Patent [19]

Hladky et al.

[11] Patent Number: 4,599,070

[45] Date of Patent: Jul. 8, 1986

[54] AIRCRAFT SIMULATOR AND SIMULATED CONTROL SYSTEM THEREFOR

[75] Inventors: Walter Hladky, Chatham; Ralph J. DeVito, Kendall Park; Louis S. Hoffman, Morristown, all of N.J.

[73] Assignee: Control Interface Company Limited, Randolph, N.J.

[21] Appl. No.: 288,131

[22] Filed: Jul. 29, 1981

[51] Int. Cl.⁴ .............................................. G09B 9/08
[52] U.S. Cl. ........................................ 434/45; 244/223
[58] Field of Search ............................ 272/135–142; 244/223, 234, 237; 434/45; 74/522, 471 R, 471 XY

[56] References Cited

U.S. PATENT DOCUMENTS

| | | | |
|---|---|---|---|
| 2,783,006 | 2/1957 | Greenland et al. | 244/223 |
| 2,788,185 | 4/1957 | Greenland et al. | 244/223 |
| 2,851,795 | 9/1958 | Sherman | 434/45 |
| 2,860,423 | 11/1958 | Dehmel | 434/45 |
| 2,935,276 | 5/1960 | Westbury et al. | 244/223 |
| 3,007,258 | 11/1961 | Hemstreet et al. | 434/45 |
| 3,031,775 | 5/1962 | Cohen | 434/45 |
| 3,403,576 | 10/1968 | Ratliff, Jr. | 74/471 |
| 3,450,081 | 6/1969 | Rabinow | 74/522 |
| 3,517,446 | 6/1970 | Corlyon et al. | 434/45 |
| 3,762,280 | 10/1973 | Kreuter et al. | 74/522 |
| 3,815,261 | 6/1974 | Faconti, Jr. | 434/49 |
| 3,960,348 | 6/1976 | Fowler et al. | 244/223 |
| 4,060,915 | 12/1977 | Conway | 434/307 |
| 4,106,728 | 8/1978 | Griffith | 244/233 |
| 4,134,560 | 1/1979 | Messerschmidt | 244/234 |
| 4,228,386 | 10/1980 | Griffith | 244/223 |

Primary Examiner—Richard C. Pinkham
Assistant Examiner—Leo P. Picard
Attorney, Agent, or Firm—Kenyon & Kenyon

[57] ABSTRACT

Disclosed are apparatus and methods for simulating a control system such as an aircraft flight control system. Image generating and display apparatus for use in conjunction with the simulated control system are disclosed. Also disclosed are apparatus and a method for simulating a movable control such as an aircraft control wheel or rudder pedals for a system in which force and movement parameters of the control can be varied in accordance with simulated operation of the system. A lever having an adjustably positioned fulcrum is utilized in the simulation of the movable control. The application further discloses a flight simulator having a pilot's console and an instructor's console interconnected by a computer. The simulator enables the pilot to "fly" an aircraft while permitting the instructor and computer to introduce various different flight and aircraft conditions into the flight simulator.

15 Claims, 29 Drawing Figures

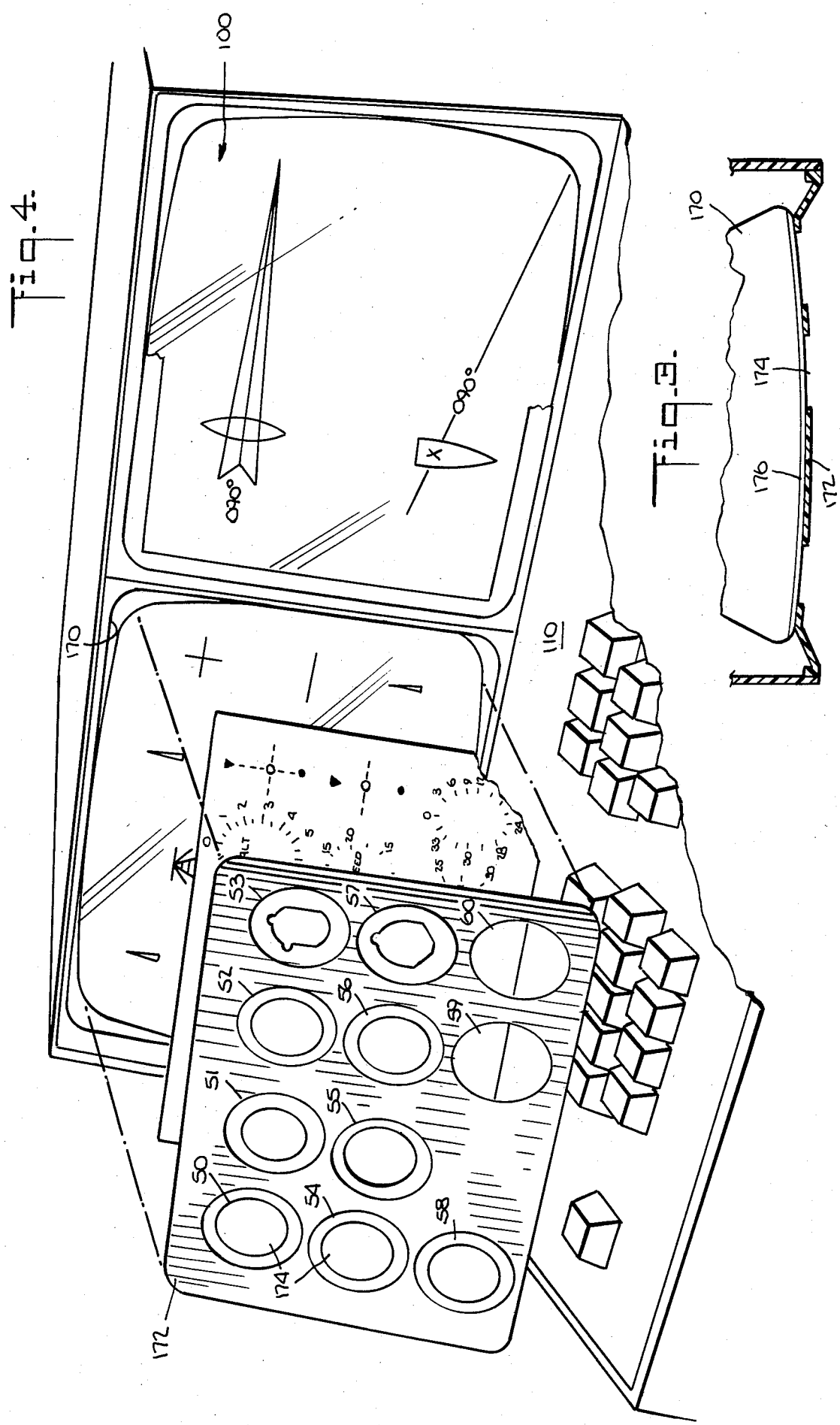

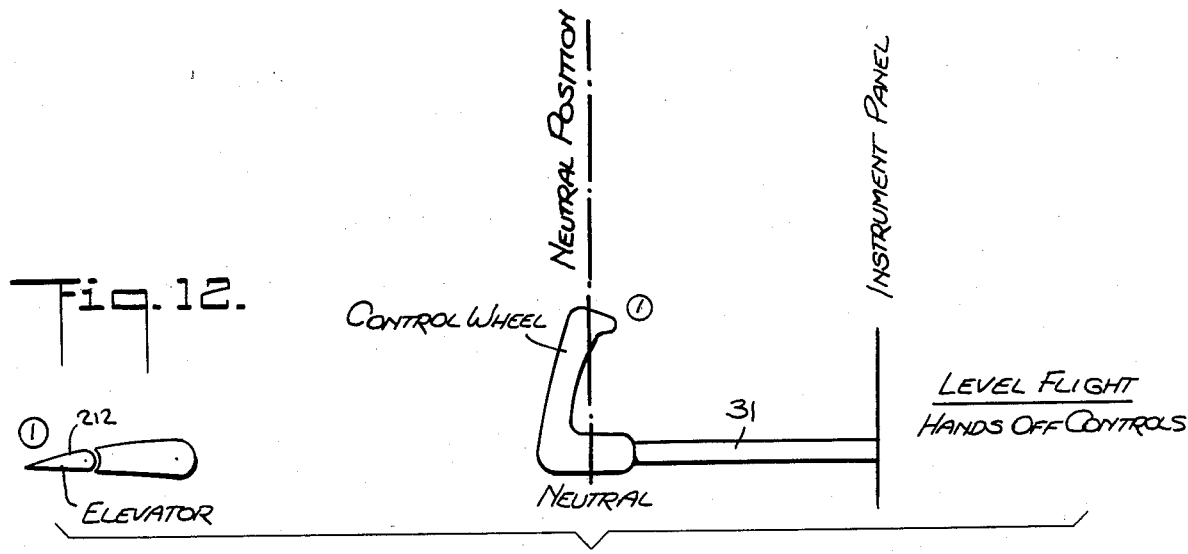
Fig. 12. Level Flight / Hands Off Controls
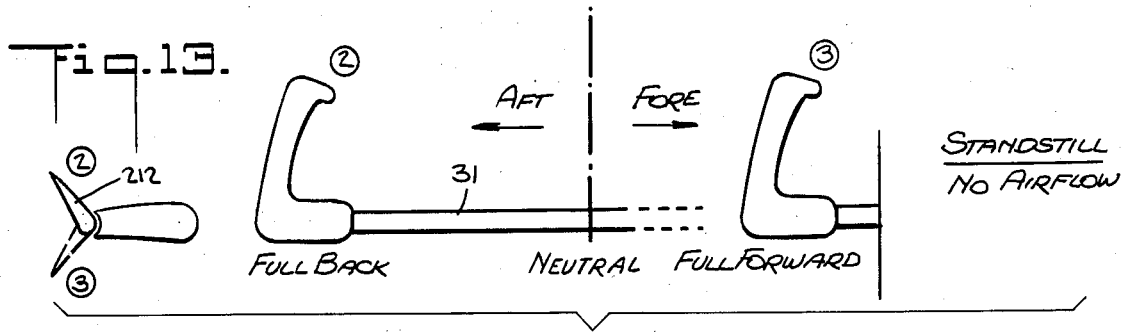
Fig. 13. Standstill / No Airflow
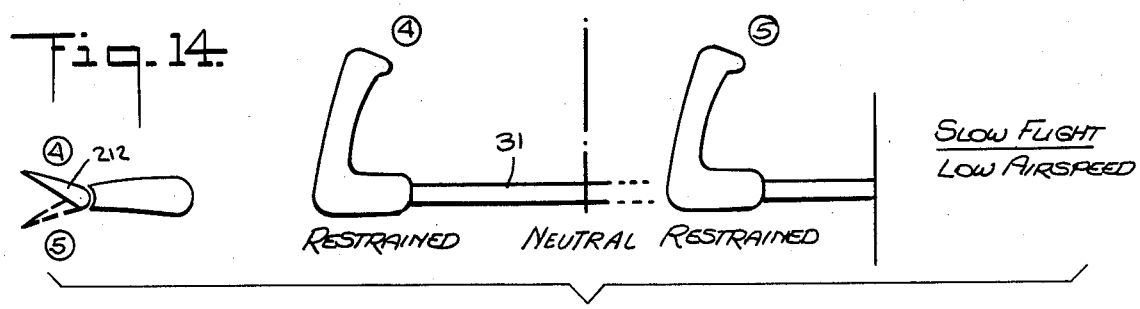
Fig. 14. Slow Flight / Low Airspeed
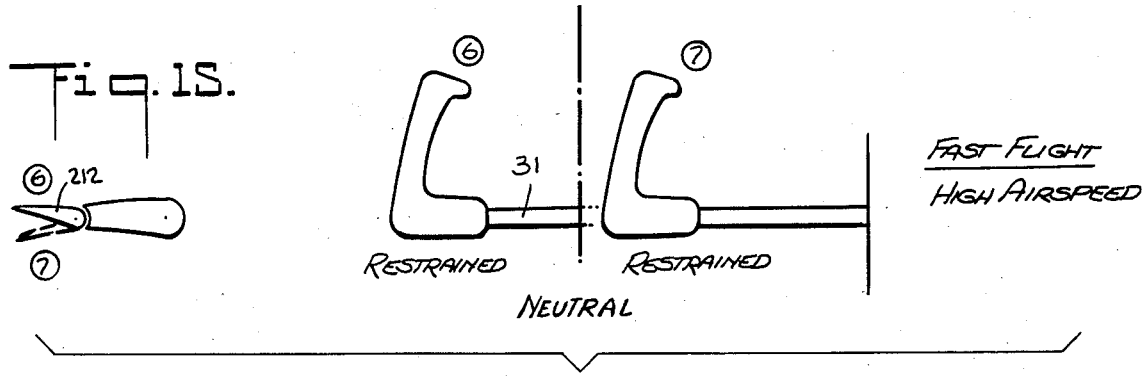
Fig. 15. Fast Flight / High Airspeed

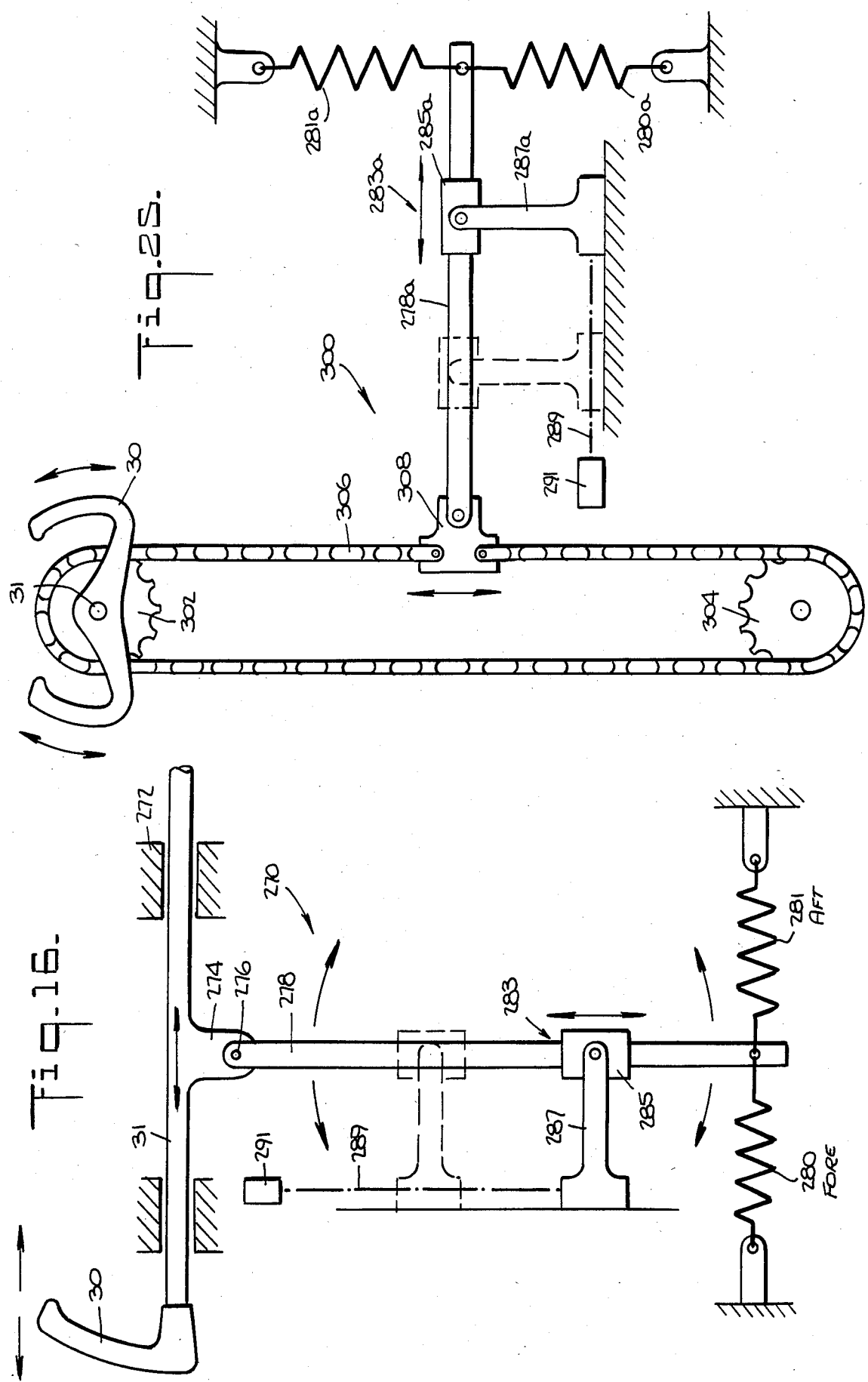

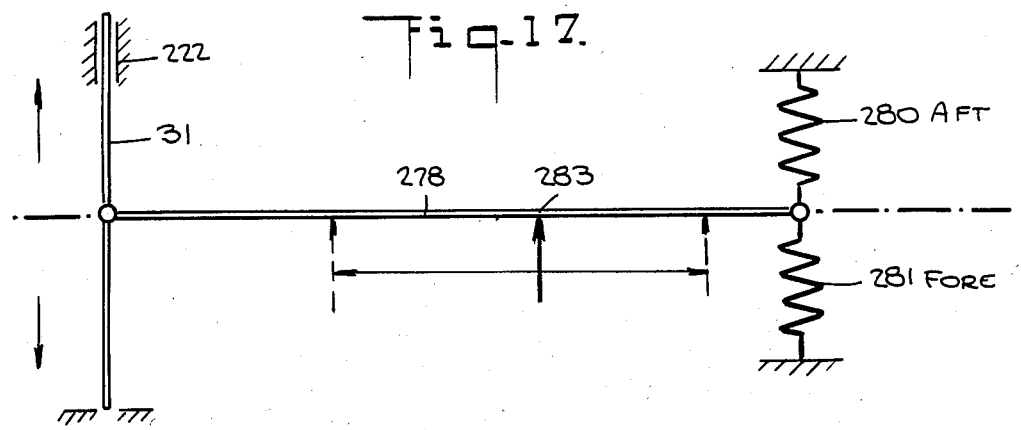
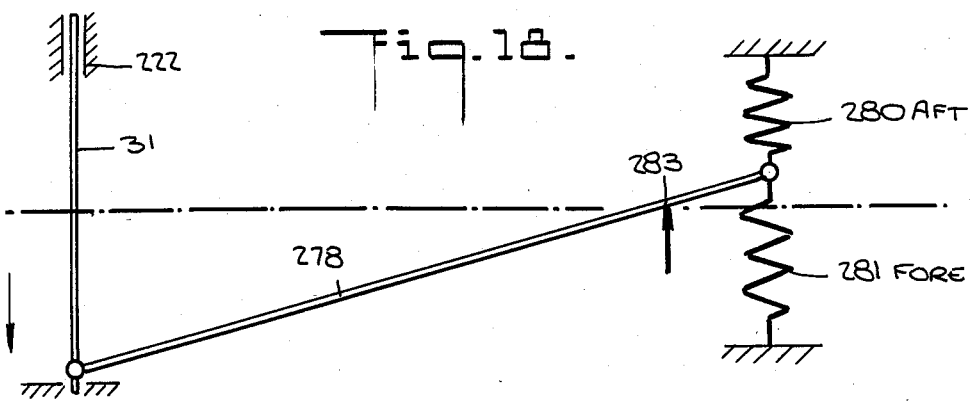
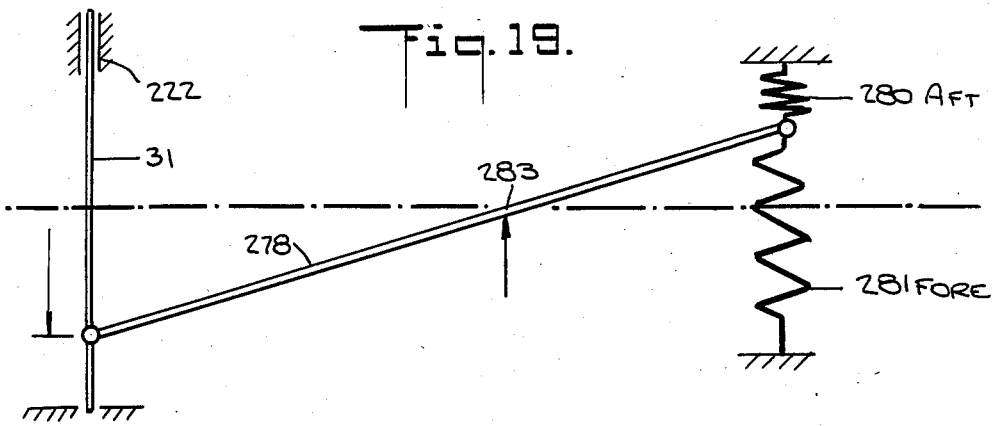
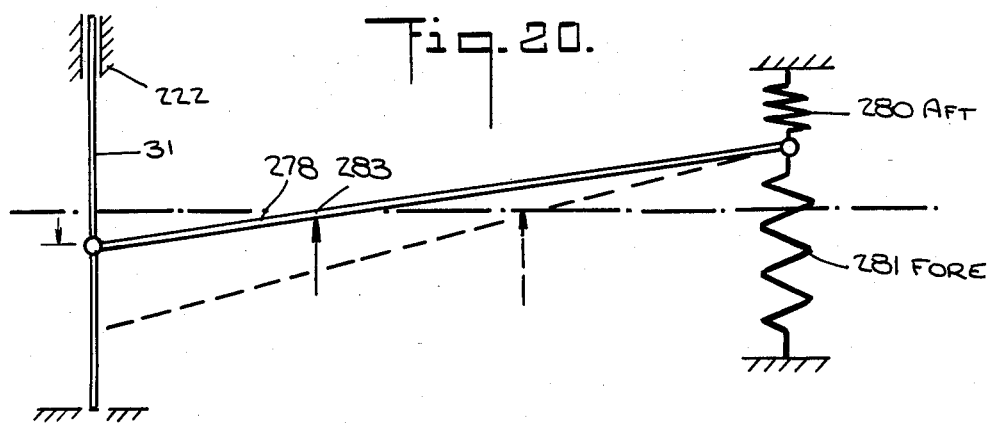

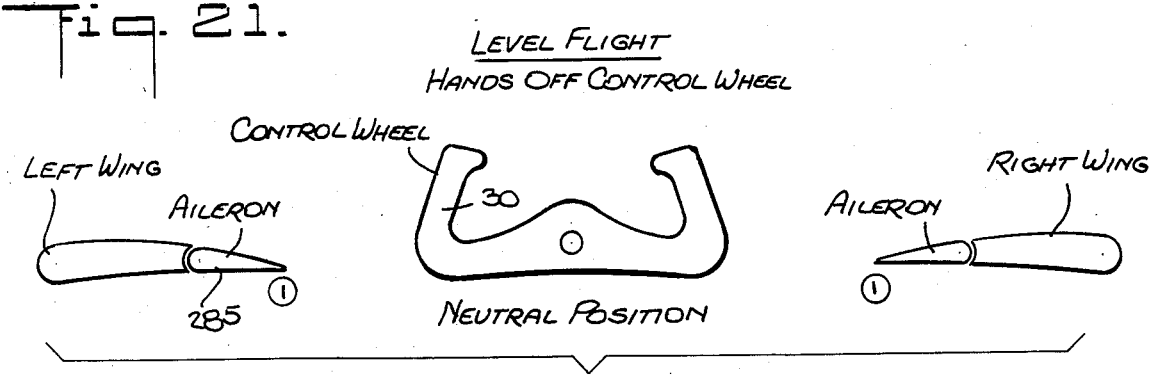
Fig. 21. LEVEL FLIGHT / HANDS OFF CONTROL WHEEL
LEFT WING, AILERON, 285, CONTROL WHEEL 30, NEUTRAL POSITION, AILERON, RIGHT WING
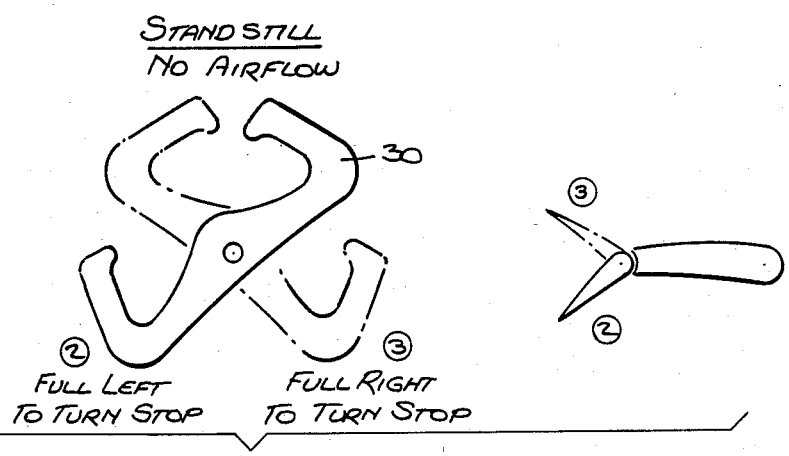
Fig. 22. STAND STILL / NO AIRFLOW
FULL LEFT TO TURN STOP, FULL RIGHT TO TURN STOP
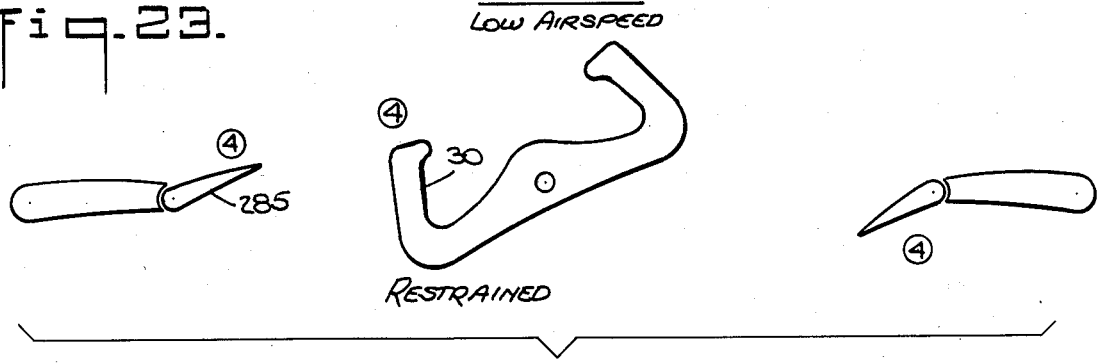
Fig. 23. SLOW FLIGHT / LOW AIRSPEED
RESTRAINED
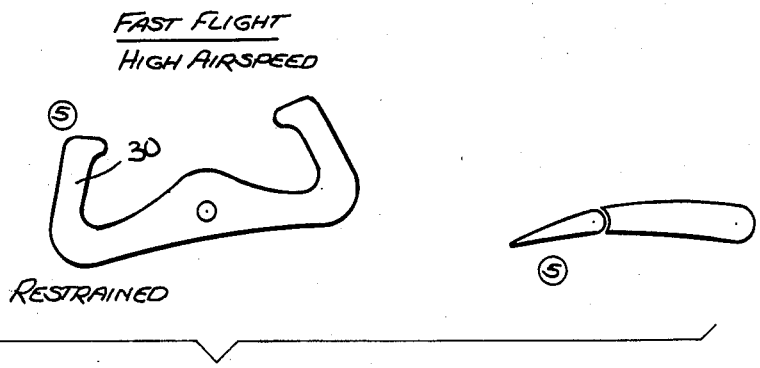
Fig. 24. FAST FLIGHT / HIGH AIRSPEED
RESTRAINED

AIRCRAFT SIMULATOR AND SIMULATED CONTROL SYSTEM THEREFOR

BACKGROUND OF THE INVENTION

The present invention relates generally to simulators, and in particular, to an aircraft flight simulator including computer-controlled simulated instruments and computer-controlled simulated feel for the aircraft controls.

Use of simulators has been increasing in recent years for aircraft flight training, for training personnel in the operation of vehicles, such as surface ships and submarines, battle tanks, etc., and for training personnel in the operation of systems, such as power plants. The use of a simulator frees the actual aircraft, vehicle or system for use while training is being conducted, and conserves fuel which would otherwise be required for the operation of the actual aircraft, vehicle or system.

A simulated flight instrument display for an aircraft simulator system is illustrated and briefly described in "Aviation Week and Space Technology," Nov. 6, 1978, at page 69. The illustrated display includes several simulated flight instruments. Both the static and dynamic portions of the instruments are generated on a cathode ray tube (CRT).

U.S. Pat. No. 4,060,915, issued Dec. 6, 1977 to Conway, and U.S. Pat. No. 3,815,261, issued on June 11, 1974 to Faconti, Jr., disclose aircraft simulator systems which include simulated instrument displays. As in the above system described in "Aviation Week and Space Technology," both static and dynamic information is generated to be displayed on a CRT or as a photographic projection upon a screen.

One disadvantage of prior simulator systems is that they typically have complex and accordingly expensive electromechanical equipment in order to realistically generate the feel of manual control inputs in response to a manual command. This tends to make the overall simulator such as a flight simulator more complex and more expensive.

OBJECTS AND SUMMARY OF THE INVENTION

It is an object of the present invention to provide a simulated control system which avoids the aforementioned and other disadvantages.

It is another object of the present invention to provide an improved feel system for the manual controls of a simulator system.

It is still another object of the present invention to provide a realistically feeling and yet relatively uncomplicated and inexpensive feel system for a simulator.

It is also an object of the present invention to provide an improved system for simulating the feel of the flight controls of a flight simulator.

Some of the above objects and other objects of the invention are achieved in a feel system of a simulator such as a flight simulator which includes apparatus for simulating one or more instruments, indicators and the like (hereinafter referred to as "indicator"), each of which has a dynamic portion and a static portion, comprising means for visually displaying the dynamic portion of each indicator being simulated and an overlay disposed adjacent to the displaying means which provides the static portion of each indicator being simulated and permits viewing of the dynamic portion of each indicator being simulated.

Means are provided for generating dynamic imagery signals representative of different conditions of the dynamic portion of each indicator being simulated, and the displaying means is coupled to the generating means.

The displaying means includes a viewing surface on or through which the dynamic imagery corresponding to the dynamic portion of each indicator being simulated can be displayed. The overlay is disposed adjacent to the viewing surface and includes a predetermined portion through which the dynamic imagery corresponding to the dynamic portion of an indicator can be viewed. The overlay is so disposed and the dynamic imagery is so generated that a respective predetermined portion of the overlay and the associated dynamic imagery when displayed are in registration. The overlay further includes indicia disposed adjacent to the predetermined portion and corresponding to the static portion of each indicator being simulated. The overlay further includes a remaining portion masking substantially all portions of the overlay except the indicia and the predetermined portions in registration with the associated displayed dynamic imagery.

The overlay can comprise first and second overlays. The first overlay is disposed adjacent to the viewing surface of the displaying means with the first overlay including a predetermined portion through which the dynamic imagery can be viewed. The first overlay is so disposed with respect to the dynamic imagery to be displayed to enable the predetermined portion of the overlay and the dynamic imagery to be in registration. The first overlay further includes indicia which are disposed thereon adjacent to the predetermined portion and corresponding to the static portion of each indicator being simulated.

The second overlay is opaque and is disposed adjacent to the viewing surface and the first overlay. The second overlay has at least one window portion (e.g. open or transparent) therein for exposing the indicia and the predetermined portion in registration with the displayed dynamic imagery, and masks the remainder of the first overlay.

The viewing surface is generally flat and the first overlay is a sheet which can conform to the viewing surface. The overlay sheet is preferably in the form of a transparency, preferably of plastic, having an opaque portion surrounding each transparent portion. The second overlay is preferably substantially identical to a panel overlaying the apparatus being simulated and can comprise a vacuum-formed plastic panel.

Where a single overlay is utilized, the side of the single overlay facing the displaying means is generally flat and the side facing away from the viewing means is substantially identical to a panel overlaying each indicator being simulated.

The feel system of the invention can be utilized to simulate the feel of control inputs for many different types of systems. The invention however is illustrated and described herein in connection with the simulation of an aircraft flight control system. The application describes and illustrates a flight simulator having the following aircraft indicators: air speed indicator; attitude gyro; altimeter; ILS indicator; turn coordinator; directional gyro; vertical speed indicator; VOR indicator; manifold pressure gauge; tachometer; and ADF indicator.

The overlay has indicia representing the static portion of each indicator and the generating means generates an image of the dynamic portion of each indicator to be simulated which is displayed by the displaying means. For example, the overlay can have indicia applied thereto representing: the fixed markings (scales) of an air speed indicator, an altimeter, a vertical speed indicator, a manifold pressure gauge, a tachometer, and an ADF indicator while the generating means generates an image of a movable indicator needle to simulate those indicators; the fixed markings of an attitude gyro while the generating means generates an image of a movable horizon; the fixed markings of an instrument landing system (ILS) indicator while the generating means generates images of a movable crosspointer; the fixed markings of a turn coordinator while the generator means generates an image of a movable ball in a race and a movable silhouette of an aircraft; the fixed markings of a directional gyro (an aircraft on a heading) while the generating means generates an image of a movable rotating compass scale; and the fixed markings of a radio direction (VOR) indicator while the generating means generates an image of the moving portion of the indicator.

The means for generating can include a computer which controls image generating and display apparatus which can comprise: vector CRT apparatus; bit map apparatus; flying spot scanner apparatus which can include a photomultiplier, a monoscope or a charactron; liquid crystal apparatus; plasma apparatus; and PLZT ceramic apparatus.

Providing the static portion of each indicator being simulated on the overlay in accordance with the invention reduces the imagery that must be generated, thereby reducing the complexity and cost of the image generating system. Additionally, changes can be made to the static portion of the indicator being simulated without changing any part of the active image generating system, for example programming or memory.

Some of the above objects and other objects of the invention are achieved in accordance with one aspect of the invention by providing a simulator system which includes a pilot's control and display console of an aircraft and an instructor's console and in which the system provides interaction between controls operated by a student pilot, indicators, and flight and aircraft conditions introduced by a computer or an instructor.

The simulator system of the invention can be used in conjunction with apparatus for simulating a movable control for a system in which force and movement parameters of the control can be varied. Such apparatus includes a lever apparatus coupled to a movable control element. The lever apparatus comprises a lever having first and second ends, means for pivoting the lever at a point adjustably positioned between the first and second ends and means coupled to the second end of the lever for resiliently resisting pivoting of the lever. The lever apparatus further comprises means for coupling the first end of the lever to the control element for moving the first end of the lever to pivot the lever in response to movement of the control element and means for positioning the pivot means to any one of a plurality of adjustable points between the first and second ends of the lever to thereby change the fulcrum of the lever and the force and distance relationship at the ends of the lever, whereby the force required to move the control element over a given distance can be controlled to simulate the force of operating the system.

The means for moving is responsive to conditions to be simulated during operation of the system.

The apparatus can be connected to a computer-controlled system in which the means for adjustably positioning the pivot means under computer control responsive to conditions to be simulated during operation of the system.

The apparatus can be coupled to a rotatable control element such as an aircraft control wheel or to generally linearly movable control elements such as an aircraft control wheel or rudder pedals.

When the apparatus is coupled to a rotatable control element, the coupling means couples the first end of the lever to the control element for moving the first end of the lever in response to rotation of the control element. The coupling means can comprise a first wheel connected to the control element to rotate therewith, an endless element extending about the first wheel and being driven by the first wheel, a second wheel spaced from the first wheel and fixed thereat, the endless element extending about the second wheel and permitting the endless element to move in response to rotation of the first wheel. The second wheel is also rotatably mounted and rotates in response to movement of the endless element. As disclosed, the first and second wheels are sprocket wheels, the endless element is a chain and the coupling means includes a bracket secured as part of the endless element to move therewith and is pivotally connected to the first end of the lever.

When the apparatus is coupled to a generally linearly movable control element, the coupling means couples the first end of the lever to the linearly movable control element for moving the first end of the lever in response to linear movement of the control element. The coupling means can comprise means for pivotally connecting the first end of the lever to the control element.

The resisting means of the apparatus, whether the apparatus is to be coupled to a rotatable or linearly movable control element, can comprise spring means connected to the second end of the lever to resist pivotal movement thereof. The spring means can comprise a first spring having one end connected to the second end of the lever and another end fixed at a point spaced from the second end of the lever and located in a direction of movement of the second end of the lever, and a second spring having one end connected to the second end of the lever and another end fixed at a point spaced from the second end of the lever and located in another direction of movement of the lever opposite to said one direction.

The pivot means for the apparatus whether coupled to a rotatable of linearly movable control element can comprise a slide bearing slideably movable along the lever and a bracket pivotally connected to the slide bearing.

These and other objects, aspects, features and advantages of the invention will be more apparent from the following description of the preferred embodiments thereof when considered with the accompanying drawings and appended claims.

BRIEF DESCRIPTION OF THE DRAWINGS

The present invention is illustrated by way of example and not limitation in the figures of the accompanying drawings in which like references indicate similar parts and in which:

FIG. 3 is a fragmentary section view taken along lines 3—3 of FIG. 3 and showing an overlay for a CRT display with indicia on the overlay;

FIG. 4 is an enlarged, exploded view, in perspective, of the instructor's console of FIG. 1;

FIGS. 12-15 are schematic diagrams of an aircraft control column and an aircraft's elevators which illustrate control of the elevators by the control column for different flight conditions;

FIG. 16 is a schematic diagram of apparatus according to the invention for simulating the response and feel of the control column when operating an aircraft's elevators for different flight conditions;

FIGS. 17-20 are schematic diagrams of the apparatus of FIG. 16 depicting different operating positions of the apparatus;

FIGS. 21-24 are schematic diagrams of an aircraft control wheel and an aircraft's ailerons which illustrate control of the ailerons by the control wheel for different flight conditions;

FIG. 25 is a schematic diagram of apparatus according to the invention for simulating the response and feel of the control wheel when operating an aircraft's ailerons for different flight conditions.

DESCRIPTION OF THE PREFERRED EMBODIMENTS

Referring more particularly now to the drawings, simulator apparatus in accordance with the invention for a Cessna Type 172 RG aircraft is illustrated. It is to be understood, however, that the principles of the invention and the invention itself are applicable in and to simulators for other types of aircrafts as well as for simulating operation of systems other than aircraft. For example, the invention is applicable to power plant control procedure simulators, nuclear reactor control procedure simulators for power plant and other applications, driver training (e.g. automobile) simulators, earth moving and construction equipment simulators, surface and submarine ship and boat simulators, vehicle simulators (e.g. battle tank) and others.

Figure 1:
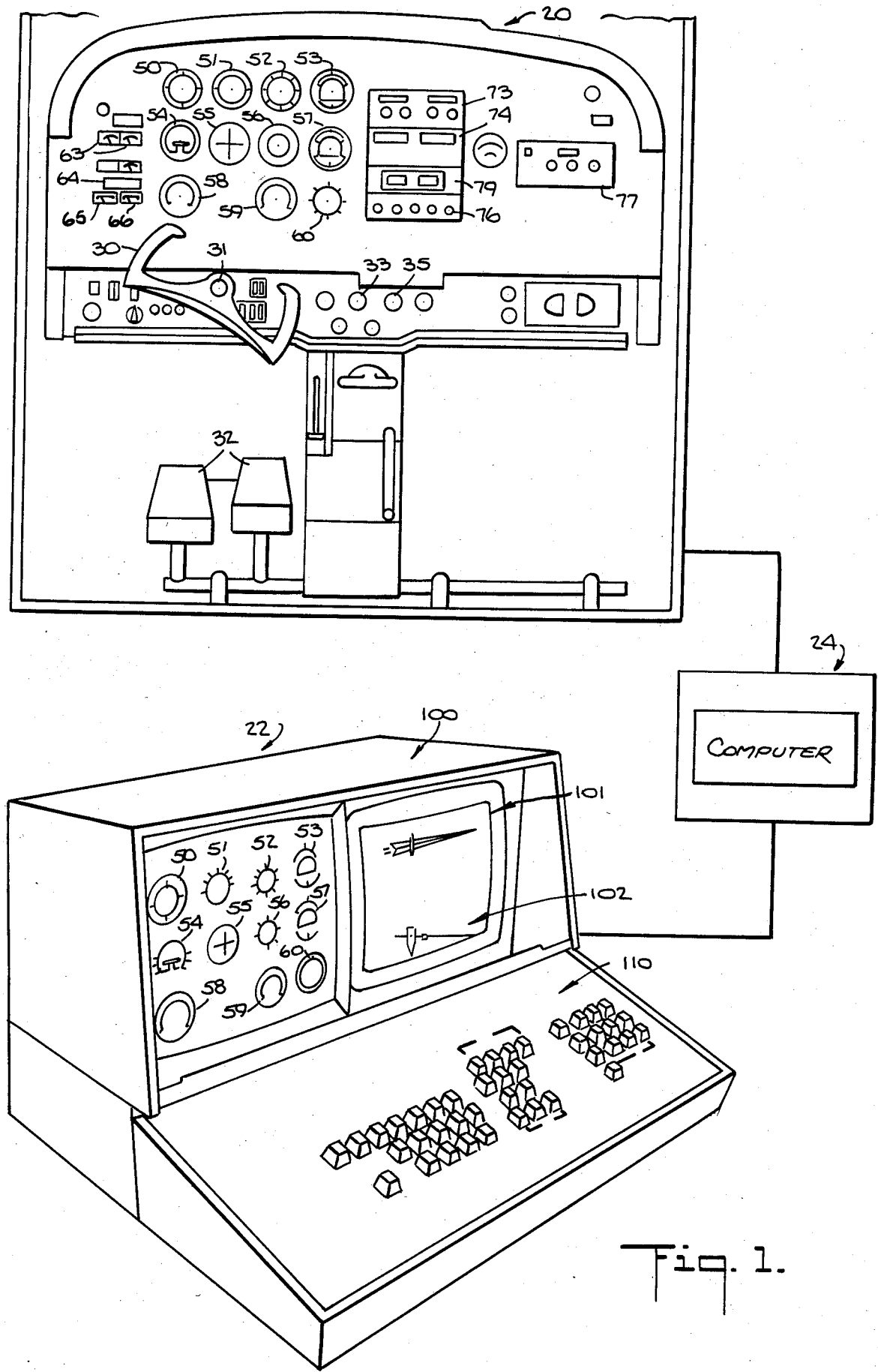
FIG. 1 is a composite view of a simulator apparatus according to the invention and includes a front view of a simulated pilot's control and display console of an aircraft, a perspective view of an instructor's console, and a block diagram of a computer system linked to the pilot's console and to the instructor's console.

Referring first to FIG. 1, a simulator apparatus is depicted for a Cessna Type 172 RG aircraft and includes a pilot's control and display console 20, an instructor's console 22 and a computer 24 linked to the pilot's console and to the instructor's console.

The pilot's console includes flight controls and aircraft and avionics indicators. The flight controls can include the following controls which are designated by the indicated reference numerals:

Control wheel 30
Control Column 31
Rudder Pedals 32
Throttle 33
Propeller Control 34
Mixture Control 35
Carburetor Heat 36
Magneto Switch 37
Flap Switch 38
Pitch Trim (manual) 39
Rudder Trim (manual) 40
Cowl Flaps 41
Circuit Breakers 42
Master Switch 43
Gear Switch and Lights 44
Avionics Master Switch 45

The aircraft flight and engine indicators can include the following designated by the indicated reference numerals:

Air Speed Indicator 50
Attitude Gyro 51
Altimeter 52
ILS Indicator 53
Turn Coordinator 54
Directional Gyro 55
Vertical Speed Indicator 56
VOR Indicator 57
Manifold Pressure Gauge (MAP) 58
Tachometer 59
ADF Indicator 60
Fuel Pressure Gauge 61
Exhaust Gas Temperature Gauge 62
Fuel Quantity Indicators 63
Oil Pressure Gauge 64
Oil Temperature Gauge 65
Cylinder Head Temperature Gauge 66
Ammeter 67

Digital Clock 68
Flight Hour Recorder 69
Suction Gauge 70
Magnetic Compass 71

The avionics can include the following which are designated by the indicated reference numerals:
Communication Transeivers 72
VOR Receivers 73
Nav Indicators 74
Horizontal Situation Indicator 75
Transponder Control 76
ADF Receiver 77
ADF Indicator 78
DME Indicator 79
Three Light Marker Beacon Display 80
Audio Switch Panal 81

Although not shown, the simulator apparatus can also include an adjustable pilot's seat, a two-way communication system between the instructor and the student through microphones, speakers and/or head sets, and means for simulating engine noise as well as the sound of wheels during landing.

The instructor's console 22 includes the following flight, engine and avionic indicators which are also present on the pilot's console: air speed indicator 50, attitude gyro 51, altimeter 52, ILS indicator 53, turn coordinator 54, directional gyro 55, vertical speed indicator 56, VOR indicator 57, mainfold pressure gauge 58, tachometer 59 and ADF indicator 60.

The instructor's console also includes a CRT upon which appears a split screen display 100 comprising a plot of the simulated flight path. The upper portion 101 of the split screen display, in either real time or in a post flight display, comprises a plan view of the flight path controlled by the pilot's console superimposed upon an intended ground track. The lower portion 102 of the split screen display comprises a presentation of the flight path angle controlled by the pilot's console superimposed on an intended descent profile such as a glide slope.

The instructor's console 22 includes a keyboard 110 or other input means such as a light pen control on the CRT which enables the instructor to control a number of training options as described below. Starting at the lefthand side of the keyboard 110 (FIG. 2), buttons 111, 112 and 113 control the progress of the computer program of the computer 24 (FIG. 1). The REFLY button 111 (FIG. 2) returns the computer program to its starting point from any point to which it had progressed. The HOLD button 112 stops the progress of the computer program and holds the computer program at the point it is stopped. The CONT. button 113 resumes the progress of the computer program from the point at which it had been held.

Buttons 114-127 permit the instructor to introduce a number of simulated emergencies which may arise during a flight. The FAIL ELEC button 114 can introduce a simulated failure in the aircraft electrical system. The HOLD GEAR button 115 can introduce a simulated failure of the landing gear operating system, i.e., the landing gear is jammed and can not be moved from the position it was last in. The HOLD FLAP button 116 can introduce a simulated failure of the control system for the flaps, i.e. the flaps are jammed and cannot be moved from the position they were last in. The FAIL MAG button 117 can introduce a simulated failed magneto. FAIL VOR LOC button 118 can introduce a simulated failure of the VOR or localizer receiver system. FAIL GS button 119 can introduce a simulated failure of the glide slope receiver system. FAIL MAR button 120 can introduce a simulated failure of the glide slope marker detection system. The FAIL COM button 121 can introduce a simulated failure in the communications system. The FAIL DME button 122 can introduce a simulated failure in the DME or distance measuring eqipment system. The FAIL VAC button 123 can introduce a simulated failure in the aircraft vacuum system. The FAIL STATIC button 124 can introduce a simulated failure in the aircraft static pressure flight system which will result in a decrease in the readings of the static indicators which comprise the air speed indicator 50, the vertical speed indicator 56 and the altimeter 52. PITOT ICE button 125 can be used to introduce simulated icing in static or dynamic pressure openings of the pitot tube of the aircraft. In the event of a pitot ice situation, the pilot would apply corrective action by switching to the alternate static system in the aircraft and would pull and open the alternate static air source knob. Upon activating the alternate static air source knob, the indication of the static instruments would return to within approximately 5% of their proper readings. To return the static instruments to 100% of their proper readings in accordance with the information in the pilot's operating handbook, the pilot must vent the cabin by opening the cabin heat and/or cabin air vents. The CARB ICE button 126 can introduce a simulated carburetor icing condition. The FUEL LOW button 127 can be used to simulate an out-of-fuel emergency.

Buttons 128-136 in the central part of the keyboard 110 can be used to simulate different wind conditions. Buttons 0KT, 15KT, 30KT and 45KT (128-131, respectively) can be used to simulate wind conditions of 0 knots, 15 knots, 30 knots and 45 knots, respectively. Buttons "2000" (133) and "1000" (134) are used to introduce simulated wind shear conditions at altitudes of 2000 feet and 1000 feet, respectively. A wind shear effect is simulated by pressing one of the wind speed buutons 128-131 and one of the wind direction buttons (144-152). Button 148 simulates a tail wind condition. Each of the other wind direction buttons is marked with a direction in degrees such as 45°, 90°, 135°, 180°, 225°, etc. OFF butttton 132 terminates the simulated wind shear condition. Introduction of the automatic wind shear effect results in an automatic shift of wind direction and a change in wind velocity for a selected altitude of 2,000 or 1,000 feet as controlled by the computer program.

CG ON button 135 is used to introduce a simulated shift of the center of gravity of the aircraft which the CG OFF button 136 terminates. Below the CG buttons 135, 136, in the central lower portion of the keyboard 110, buttons 137-139 are used to provide different aircraft loading conditions. MIN button 137 provides for a minimum aircraft loading; MED button 138 provides for a medium aircraft loading; and Max button 139 provides for a maximum aircraft loading. The center of gravity shift of the aircraft as controlled by CG buttons 135-136 can be used in conjunction with the different loading conditions of the aircraft as determined by buttons 137-139.

Further to the right on keyboard 110 are located buttons 140-143 for simulating various different air turbulence conditions. LT button 141 simulates light turbulence; MOD button 142 simulates moderate turbulence; and SEV button 143 simulates severe air turbulence. OFF button 140 terminates the turbulence condition introduced by any of buttons 141–143.

The simulator apparatus is also operative to simulate air speed response to pitch and to bank angle, and yaw response to rudder, as well as, and spiral divergence response. In addition, the simulator apparatus includes control feedback between the control wheel and the ailerons, between the control column (fore and aft) and the elevators, and between the rudder pedals and the rudder. Thus, the control wheel control and control column positions are related to aileron and elevator positions. Movement, feel and response of the control wheel and control column simulate flight conditions as related to air speed, pitch, bank angle, yaw and spiral divergence. The computer 24 including the computer program provides the desired relationship among the control wheel, the control column and the rudder pedals, aircraft operating conditions and the aircraft indicators.

INDICATOR SIMULATION

The simulated flight, avionics and engine indicators will be described with particular reference to FIGS. 3 and 4. The flight indicators, i.e., the air speed indicator 50, altitude indicator 51, altimeter 52, turn coordinator 54, directional gyro 55 and vertical speed indicator 56, the avionics indicators, i.e. ILS indicator 53, VOR indictor 57 and ADF indicator 60, and the engine indicators, i.e. the manifold pressure gauge (MAP) 58 and the tachometer 59, are simulated on a display having a plurality of overlays thereon. In the embodiment illustrated in the drawings, the display is a 19 inch cathode ray tube (CRT) 170. However, other displays which are capable of simulating a moving image can be used. For example, the displays disclosed in copending U.S. patent application Ser. No. 165,753 filed July 3, 1980 of William Bohmer, Walter J. Betancourt and Louis S. Hoffman, entitled FIELD SENSITIVE OPTICAL DISPLAYS, GENERATION OF FIELDS, THEREFOR AND SCANNING THEREOF, and in U.S. Pat. No. 3,820,875 of William Bohmer which issued on June 28, 1974, both of which are assigned to the assignee of this application, can be utilized. The disclosures of copending application Ser. No. 165,753 and U.S. Pat. No. 3,820,875 are incorporated herein by reference. The CRT or other displays in conjunction with the computer 24 and image generating means, which will be described hereinafter, produce an image of a movable instrument vane or needle, e.g. for air speed indicator 50, an image of a movable horizon for an attitude gyro 51, an image of a movable aircraft silhouette and a movable ball in a race for a turn coordinator indicator 54, an image of a movable heading scale for a directional gyro 55, an image of a movable cross-pointer for an ILS indicator 53, and the movable portion of the VOR indicator 60, the movement of all of which are controlled by the computer.

Figure 5:
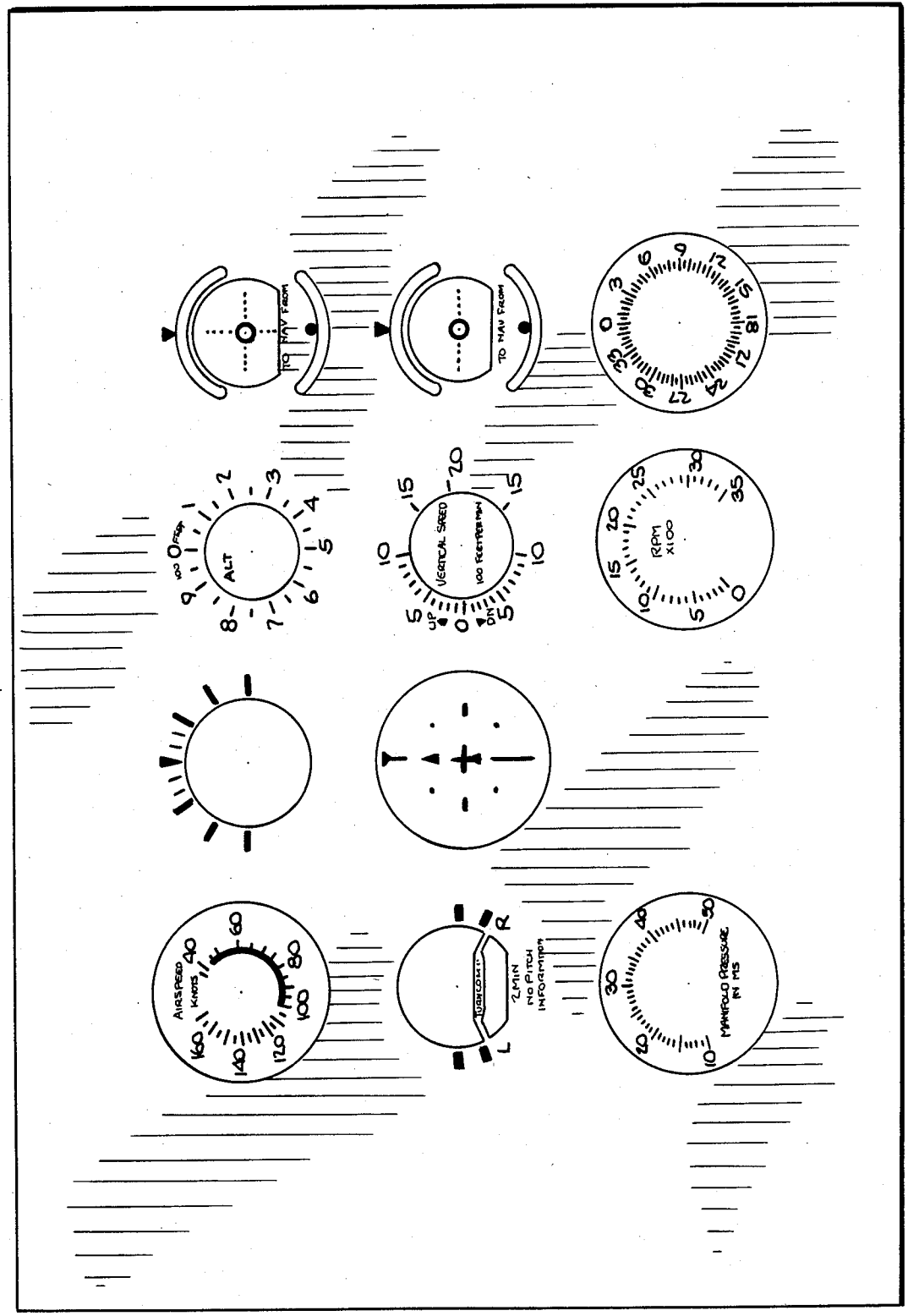
FIG. 5 is an enlarged plan view of a transparency which forms part of the overlay for the indicator display of the pilot's and instructor's consoles of FIGS. 1-4 and which includes the static indicia of the overlay.

The simulator panel fixed to the face of the CRT display 170 includes a multi-layered plastic overlay comprising an outer opaque layer 172 having openings 174 therein and an inner transparent layer 176 which is substantially co-extensive with the opaque outer overlay 172 and extends across all of the openings 174 in the outer overlay (FIG. 3). It is also within the contemplation of the invention that layers 172 and 176 be combined to form a single layer having windows, either transparent or open, and other printed matter with indicia applied in or adjacent to the windows. Alternatively, the overlay 176 can comprise a plurality of inner transparent layers each of which bears indicia for at least one indicator, with each of the individual inner transparent layers extending across a respective opening or openings of the opaque outer overlay 172. The inner transparent overlay 176 includes indicia thereon which form the non-movable parts of the various indicators of the display. Referring to FIG. 5, the inner transparent layer 176 is a transparency of Mylar or similar plastic material on which indicia and other printed matter is applied, and on which portions are made opaque and portions are left transparent. The transparent portions are generally in the form of circles which when the transparency is mounted are aligned with respective openings 174 in the outer opaque layer 172. Indicia is applied on or adjacent to the transparent portions preferably in white. The areas between individual transparent portions and the area surrounding all of the transparent portions are opaque. Parts of the overlay 176 can also be colored, for example, green and yellow areas and a red line for the air speed indicator.

The outer opaque layer 172 is preferably identical to the panel used to overlay the indicators in the actual aircraft being simulated. For example, the outer opaque layer 172 can be a vacuum formed plastic panel which is identical to the vacuum form plastic panel used in the Cessna 172 RG aircraft being simulated.

The different movable portions of the display are generated on the face of the CRT 170 in FIG. 4 by image generating means and the computer 24, as described below.

COMPUTER GENERATED AND CONTROLLED DYNAMIC INSTRUMENT IMAGERY

The controls 182 on the pilot's console which are identified as items 30–45 in FIG. 1 each include a switch and/or a potentiometer of the rotary or linear slide-type, coupled to the computer. For example, the throttle control 33 and the mixture control 35 potentiometers can each be a slide-type potentiometer. Included in the controls are potentiometers which are used to simulate the three axes of control of the aircraft (X, Y and Z axes). The output of each of the controls is coupled into the computer 24 via an analog-to-digital (A/D) converter (not shown). Alternatively, a digital encoder can be provided for each potentiometer control for the three axes of control as well as for other potentiometer simulated controls.

The moving images of the dynamic portion of the display which are presented on both the pilot's and instructor's consoles can be derived and displayed in a number of ways. For example, the dynamic images can be generated by computer-controlled image generation and display apparatus of the following types: vector CRT apparatus; bit map apparatus; flying spot scanner apparatus which can include photomultiplier tube apparatus, monoscope apparatus or charactron apparatus; liquied crystal apparatus; plasma apparatus; and PLZT ceramic apparatus. The aforementioned apparatus are meant to be illustrative and not exhaustive and other apparatus can be used to generate and display the dynamic portions of the display.

Referring to FIGS. 6–10, the controls on the pilot's console and the instructor's console are coupled through A/D converters or digital encoders to the computer (e.g. one or more Intel Corp. 8086 microprocessors and associated memory) 24, as described above.

Figure 6:
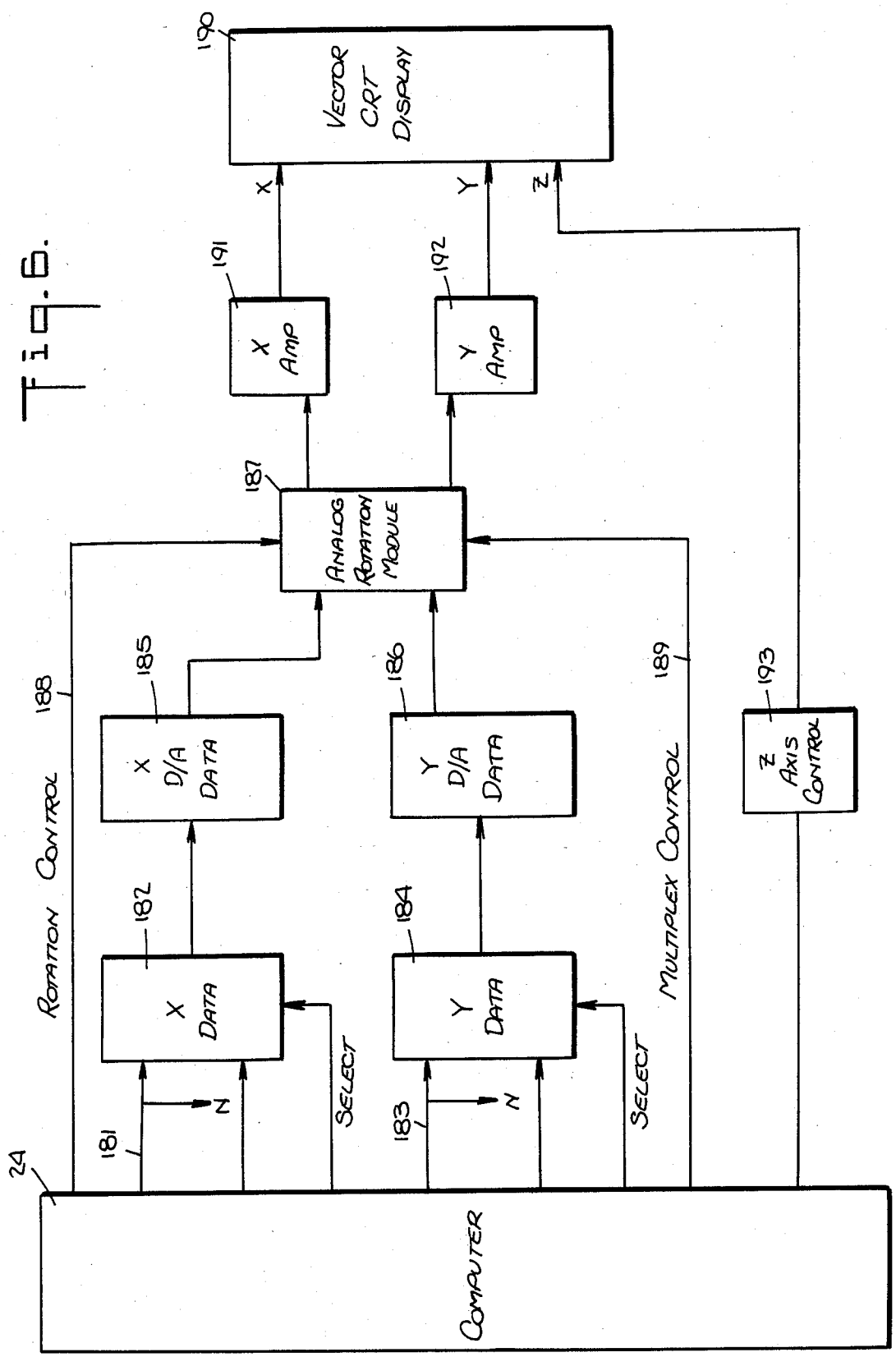
FIG. 6 is a block diagram of computer-controlled image generation and display apparatus utilizing vector CRT apparatus for generating and displaying dynamic imagery to be displayed on the pilot's console and on the instructor's console.

Referring now to FIG. 6, computer-controlled image generation and display apparatus which utilizes vector CRT apparatus for generating and displaying the dynamic portion of the display is illustrated. Computer 24 in accordance with its programming and memory generates from eight to N bits of X and Y axes display and control data representing the dynamic format of the images to be displayed. The X data is coupled from the computer on lines 181 to an X data register 182 and the Y data is coupled from the computer on lines 183 to a Y data register 184. The respective outputs of the X and Y data registers 182, 184 are coupled to respective digital-to-analog (D/A) converters 185, 186. The outputs of the X and Y D/A converters are coupled to an analog rotation module 187. The X and Y data on lines 181 and 183 represent in digital form a particular display format. That display format converted into analog form is presented to the analog rotation device for rotation to provide a format rotated in accordance with current data of that instrument. The computer 24 provides the analog rotation module 187 with the information necessary for rotating the format on rotation control line 188. Data for each display format is provided separately from computer 24 and the analog rotation module is multiplexed to provide each rotated image separately. Multiplex control of the analog rotation module 187 is accomplished by computer 24 through line 189. Thus, the analog rotation module provides a computer selected rotation angle to the individual display formats presented to it in accordance with current instrument display data provided to the computer 24 by the different controls and the program of the computer. The rotated display data is provided to a vector CRT display 190.

The analog outputs of the analog rotation module 187 are coupled to X and Y sweep amplifiers 191, 192, respectively, and applied to respective CRT deflection plates or deflection yoke circuits of the vector CRT display 190. The deflection plates or deflection yoke circuits move an electron beam which generates the desired display when the intensity is enabled by a Z axis control 194 coupled from the computer 24.

The analog rotation module 187 can for example be a sine-cosine rotator.

Analog rotation modules are known in the art and are available from Optical Electronics Inc., of Tucson, Ariz. Accordingly, further description thereof will not be made herein. Vector CRT displays are also known in the art and therefore have not been described in detail.

Still referring to FIG. 6, alternatively, rotation of the display formats can be accomplished by the computer and/or math/sine-cosine digital devices instead of the analog rotation module 187. The computer and/or math/sine-cosine digital devices compute the angle of rotation and supply rotated image data to the X and Y data registers 182 and 184, respectively, and the outputs of the X and Y D/A converters are coupled to the X and Y sweep amplifiers, respectively.

Figure 7:
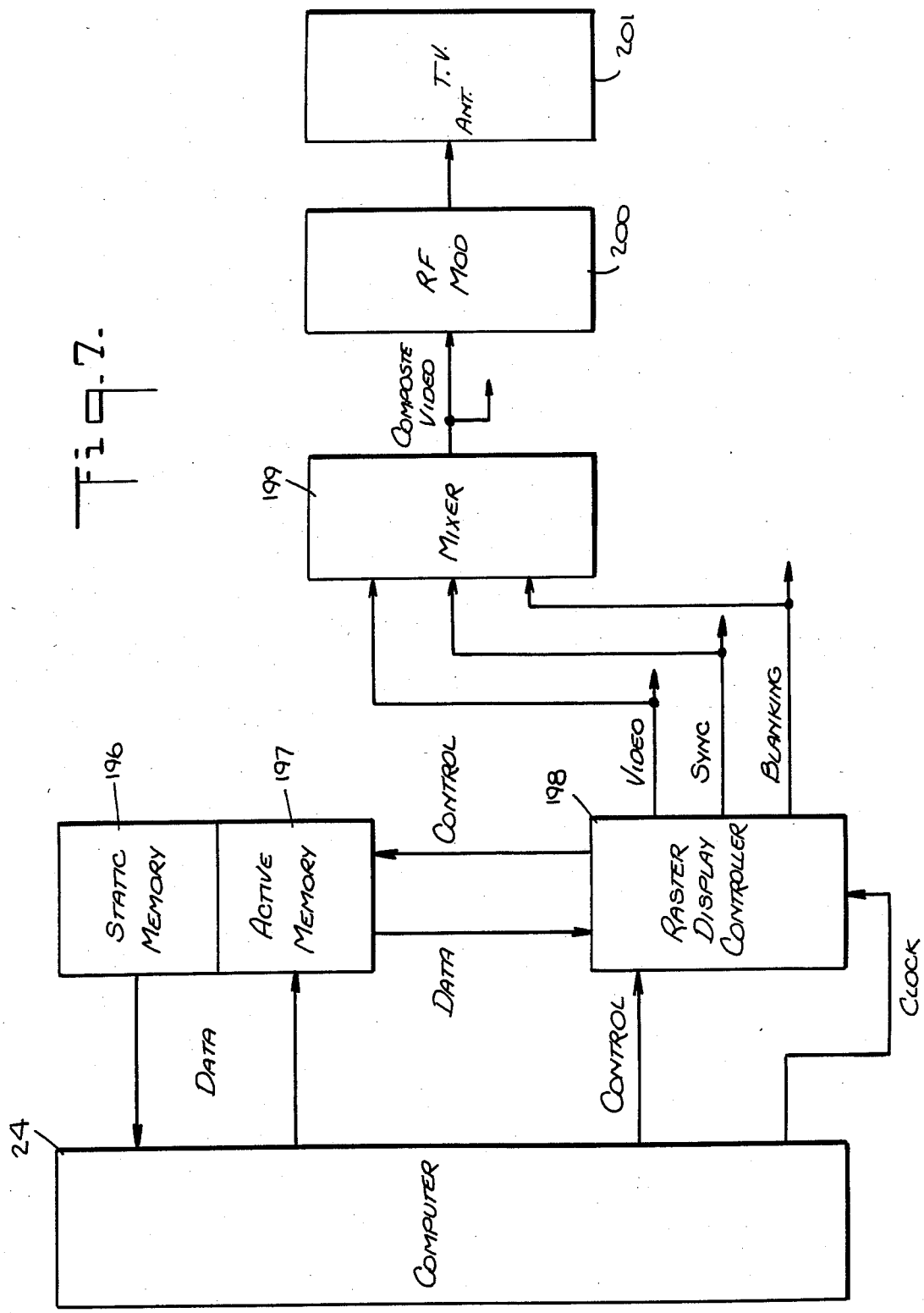
FIG. 7 is a block diagram of computer-controlled image generation and display apparatus utilizing bit map apparatus for generating and displaying dynamic imagery to be displayed on the pilot's console and on the instructor's console.

Referring now to FIG. 7, bit map apparatus controlled by computer 24 for generating and displaying the dynamic imagery to be displayed is shown. Display data for different display formats is stored in a static memory device 196 such as a read only memory (ROM). The data stored in the static memory device 196 is selected by and transferred to computer 24 which rotates the selected display format in accordance with current instrument display data. The computer 24 transfers the data representing the rotated display format to an active memory device 197 which may be a read/-write memory such as a random access memory (RAM). The active memory device is accessed by a raster display controller 198 which selects desired data under control of computer 24. The raster display controller 198 combines the selected data with other signals provided by computer 24 to provide output video, synchronizing and blanking signals. The video, synchronizing and blanking signals are combined in a mixer 199 into a composite video signal. The composite video signal is coupled to an RF modulator 200 to convert the composite video signal into a RF modulated signal. The RF modulated signal from the RF modulated 200 is coupled directly to the antenna input of a conventional TV receiver 201. The frequency of the RF modulated signal corresponds to a particular TV channel which is selected in order to display the video signal. Alternatively, the composite video signal may be coupled directly to a video monitor (not shown) for display.

Raster display controllers, mixers and RF modulators are known in the art and therefore have not been described in detail.

Figure 8:
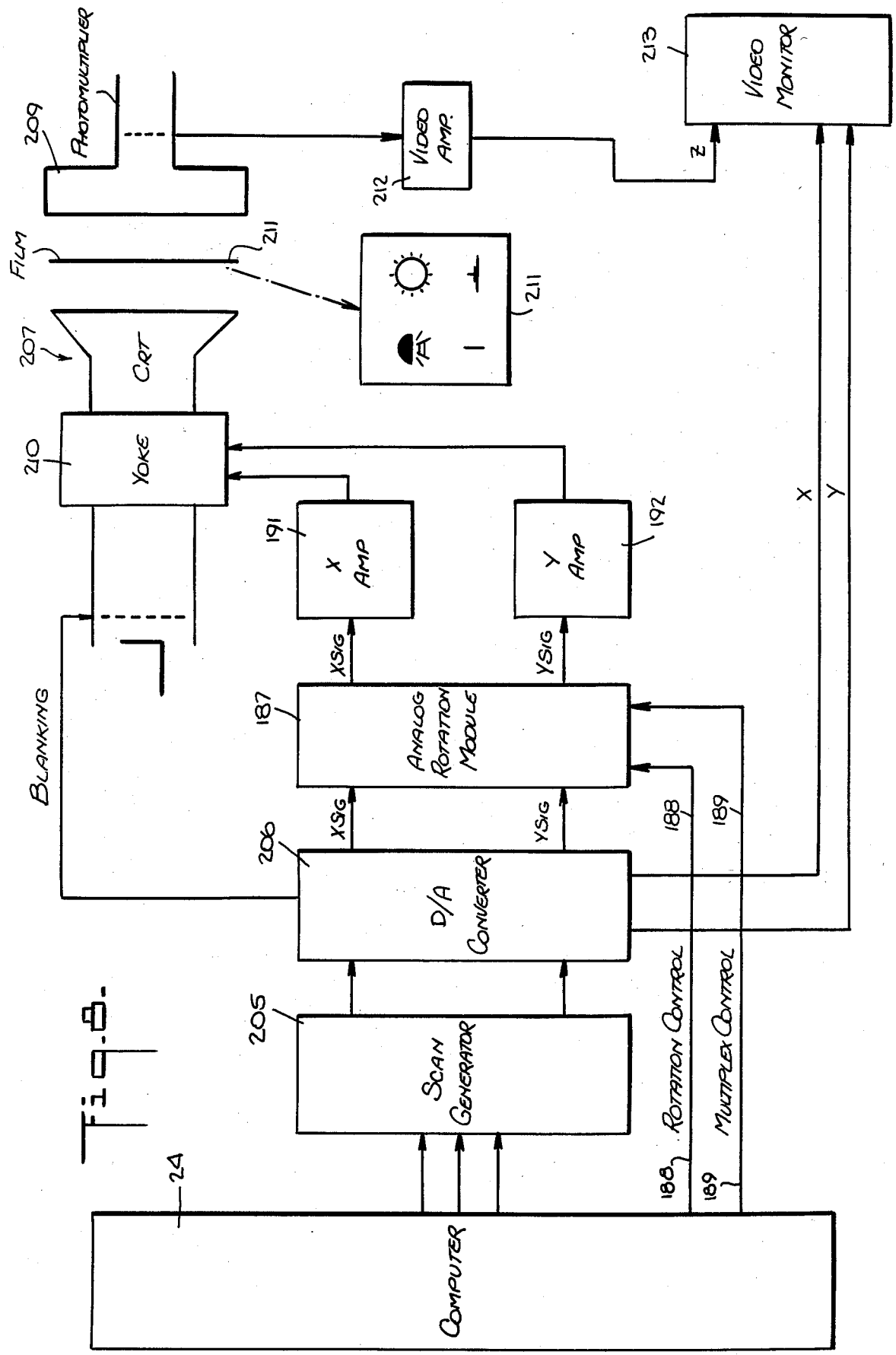
FIG. 8 is a block diagram of computer-controlled image generation and display apparatus utilizing flying spot scanner apparatus which includes photomultiplier tube apparatus for generating and displaying the dynamic imagery to be displayed on the pilot'console and on the instructor's console.
Figure 9:
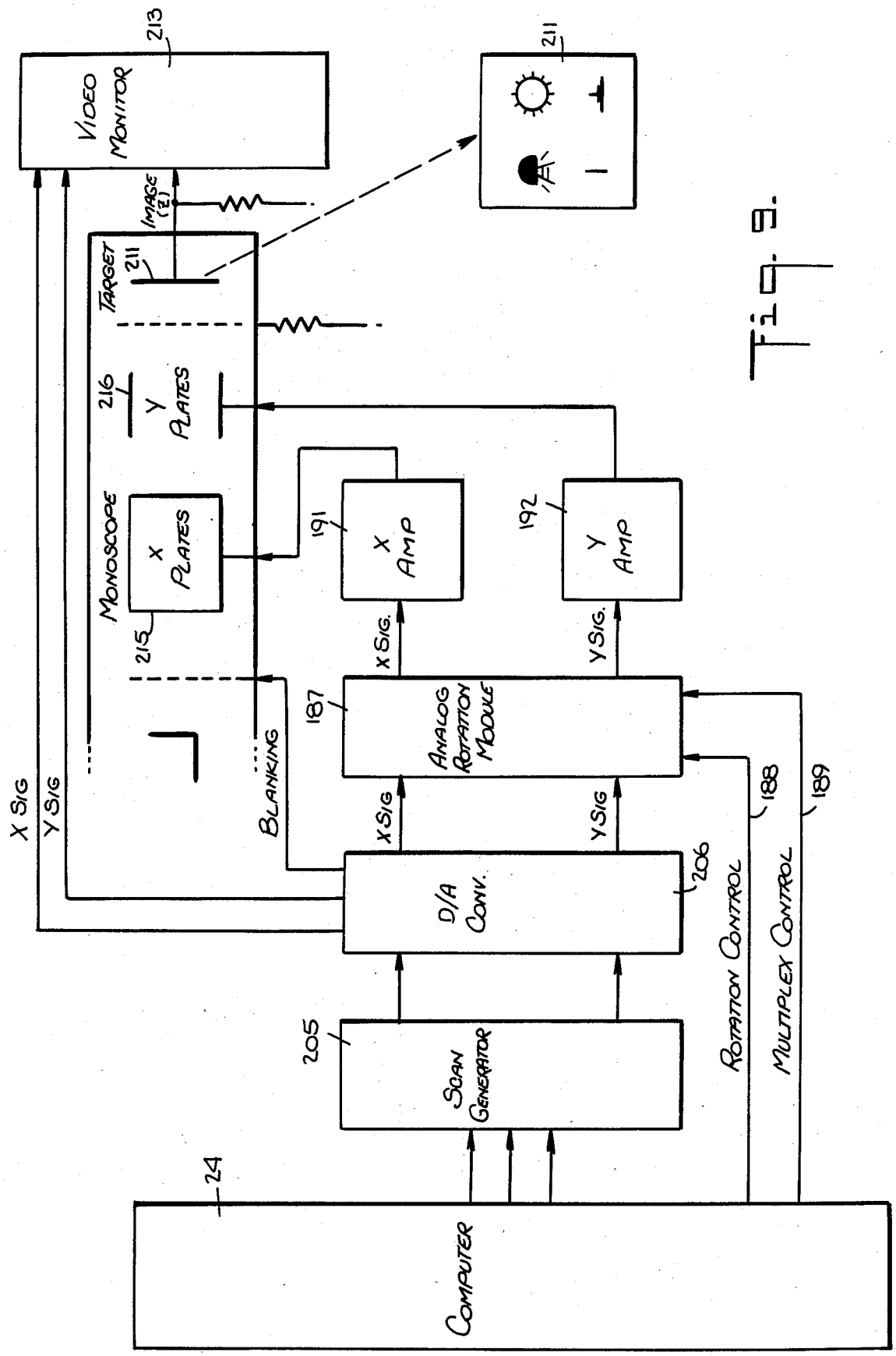
FIG. 9 is a block diagram of computer-controlled image generation and display apparatus utilizing flying spot scanner apparatus which includes monoscope apparatus for generating and displaying dynamic imagery to be displayed on the pilot's console and on the instructor's console.
Figure 10:
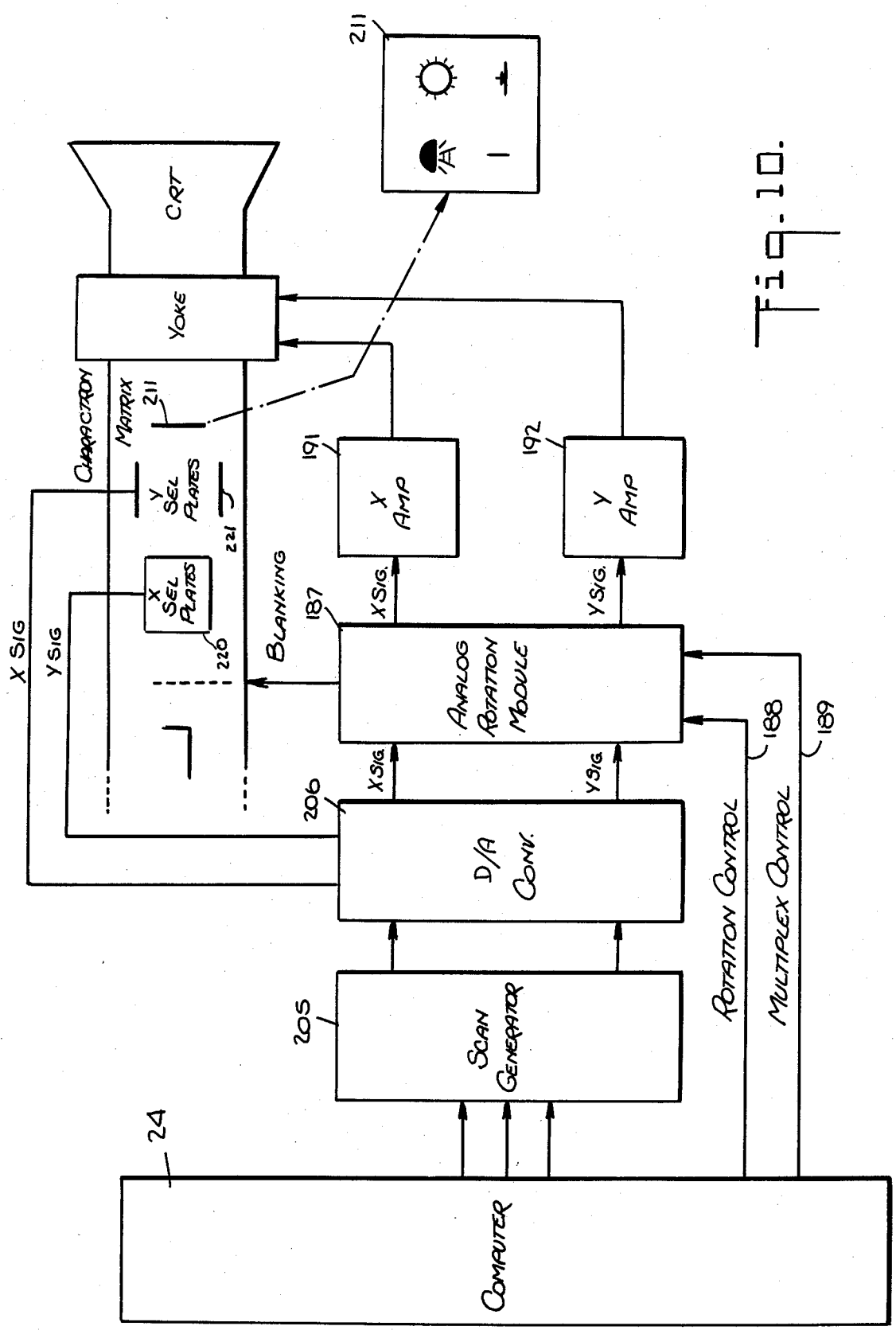
FIG. 10 is a block diagram of computer-controlled image generation and display apparatus utilizing flying spot scanner apparatus which includes charactron apparatus for generating and displaying dynamic imagery to be displayed on the pilot's console and on the instructor's console.

Referring ow to FIGS. 8-10, flying spot scanner apparatus controlled by computer 24 for generating the dynamic imagery to be displayed is illustrated. The flying spot scanner apparatus scans images of an instrument needle, and aircraft silhouette and a ball (turn coordinator), a heading scale (directional gyro), cross-pointers, etc. Scanning of the flying spot scanner is controlled by scan generator 205, D/A converter 206, analog rotation module 187, amplifiers 191 and 192 and computer 24. Computer 24 in accordance with its programing, memory and input data from the aircraft controls provides scan data to scan generator 205. The scan generator provides digital data to control the scan of the display apparatus. The digital data is converted to analog data by D/A converter 206 and supplied to an analog rotation module 187 which is described in connection with FIG. 6. The analog rotation module 187 provides the desired rotation to the analog scan data in accordance with rotation control data 188 from computer 24 as multiplexed for scanning a particular image by computer 24 via multiplex control line 189. The rotated analog scan data is coupled to X and Y amplifiers 191, 192 to be supplied to display apparatus.

As in FIG. 6, the rotation of the scan data in the apparatus of FIGS. 8-10 can be accomplished by the computer 24 and/or math/sine-cosine digital devices instead of by the analog rotation module 187.

Since the flying spot scanners of FIGS. 8-10 are known in the art, they will only be described briefly.

Referring to FIG. 8, the analog rotation module 187 provides, X, Y scanning signals to a flying spot scanner 207 which comprises a CRT 208 and a photomultiplier tube 209. The analog rotation module 187 is coupled to X and Y amplifiers which are coupled to the yoke assembly 210 of the CRT 208. The scan generator 205 is coupled to the CRT and provides blanking. The CRT beam, controlled as to position and angle and enabled by the blanking signal, scans a film 211 whose image areas supply exitation to the photomultiplier tube 209. Representative images illustrated on film 211 are a horizon, a compass heading, an instrument needle and an aircraft silhoutte. The analog rotation module provides signals to the yoke windings which enable the CRT to be scanned at any angle under control of computer 24 and the analog rotation module can provide for scanning of different images at different angles of rotation as controlled by computer 24. The video output of photomultiplier tube 209 is amplified by video amplifier 212 and is provided as a Z axis signal to a video monitor 213. X and Y signals for the deflection circuits of the video monitor 212 are provided by the X and Y signals of the scan generator 205.

Referring now to FIG. 9, the image generation apparatus is similar to that of FIG. 8 as discussed above and a monoscope is utilized as a flying spot scanner instead of a CRT and a photomultiplier tube. The X, Y analog data is coupled from the X, Y amps 191, 192 to the X and Y deflection plates 215, 216 of the monoscope tube 217. Control of the scanning angle is accomplished by providing rotated signals to the plates of the monoscope tube rather than to the windings of the CRT of FIG. 8. Blanking for the monoscope tube is provided by the scan generator. The deflection plates control the position, angle, and scan of the electron beam, as enabled by the blanking signal, across an internal target represented by film 211. The difference in electron emission between image and non-image areas of the target causes a current variation of the Z axis which is outputted and corresponds to the image areas scanned. The Z, X and Y signals thus generated are supplied to respective circuits of a video monitor 213 which cause the target image to be reproduced on the CRT screen in the desired location rotated in accordance with the angle selected by the computer.

Referring now to FIG. 10, the image generation apparatus is similar to that of FIG. 8 and a charactron is utilized as a flying spot scanner instead of a CRT and a photomultiplier tube. The X, Y data is coupled to the deflection yokes 220, 221 of the charactron 222 to control scanning. Image select plates direct an electron beam to the desired image on a matrix 211 which forms an electron beam pattern of the image as enabled by the blanking signal. The electron beam pattern thus formed is accelerated through the deflection yoke which is supplied with the rotation angle and scan currents by the analog rotation module 187 via the X, Y scan amplifiers 191, 192. The thus rotated and positioned electron pattern is further accelerated to the CRT screen phosphor to create a visible image.

The indicator overlay can include rotatable portions, such as a VOR OBS ring to reduce the image generation required. The rotatable portions of the overlay will have position sensors to provide the computer with information about the desired setting. The position sensors can be optical.

The computer in response to the program and the inputs received from the pilot's and instructor's consoles, also causes the display 180 to provide plan and elevation views of the flight path of the aircraft being directed by the pilot while also displaying a desired flight path. The glide slope angle and the planned flight path are provided on an otherwise transparent overlay. The displays of the flight path are generated by bit map display apparatus.

SIMULATED CONTROL FEEDBACK AND FEEL

Figure 11:
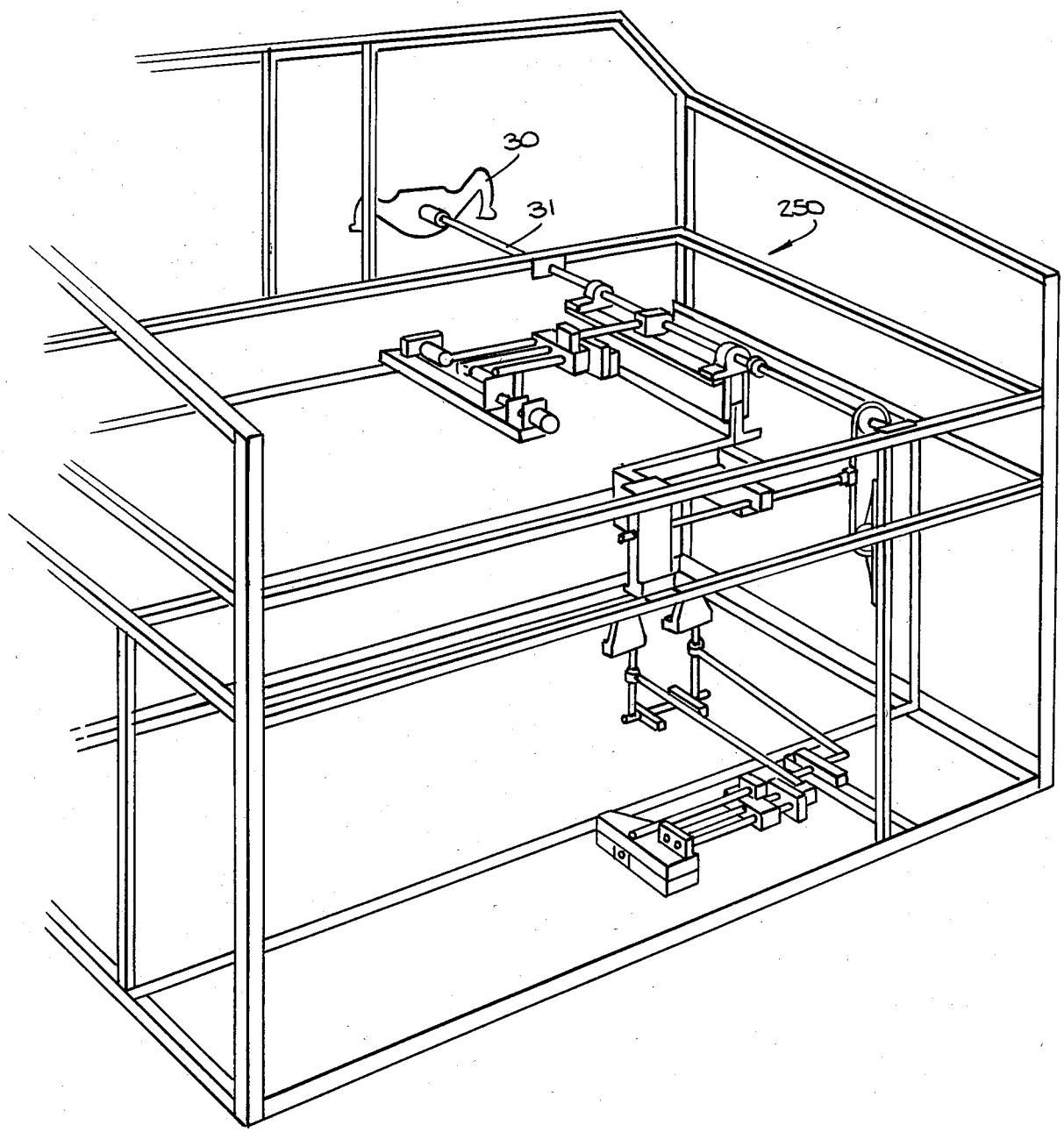
FIG. 11 is a perspective view of the rear of the pilot's console of FIG. 1 depicting a cantilever apparatus which according to the invention is coupled to the control wheel, to the control column and to the foot pedals in order to impart thereto a response and feel which corresponds to and therefore simulates the response and feel of an actual wheel, column and pedals of an aircraft during different actual flight conditions.

Inputs from the pilot's and instructor's consoles are fed to the computer 24, which, in conjunction with the computer program, provides feedback signals to apparatus 250 (FIG. 11) coupled to the control wheel 30, the control column 31 and the rudder pedals 32 to provide feel and response of those controls simulating different aircraft operating conditions.

The movable control surfaces (ailerons, elevator and rudder) of an airplane in level flight tend to "streamline" themselves and to become aligned with the air flow due to the pressure of the air flow over them. FIGS. 12–15 shown corresponding positions of the control column 31 and the elevators 212 for different flight conditions. In level flight, with the controls unrestrained, the control column 31 and elevators 212 assume the "neutral" position illustrated in FIG. 12. When an airplane is at standstill with its engine shut down, the control surfaces are free to be moved without restraint throughout their full operating range, limited only by fixed end stops. FIG. 13 illustrates the full fore and aft positions of the control column 31 from the neutral position to each of the corresponding extreme elevator positions at standstill with the engine shut down. In moving between the full fore and aft control column positions at standstill, the pilot does not encounter any reactive forces. When the airplane is in flight, however, air flow over the control surfaces exerts pressure on those surfaces and restrains their movement. The pilot perceives these pressures as reactive forces at the controls. The positions of the controls at which a given level of reactive force occurs changes with airspeed. At low airspeed, a relatively large displacement of the elevators is required to maneuver the airplane through a change in pitch in a give time as illustrated in FIG. 14. Correspondingly, the pilot perceives a certain level of reactive force upon an extended movement of the control column. The relative fore and aft displacement of the control column at which a given level of reactive force will be detected at low air speed occurs at positions of the elevators less than the full stop positions. Compare FIGS. 13 and 14.

At high airspeed (FIG. 15), a relatively small displacement of the elevators is required to maneuver the airplane through the same rate-of-change of pitch. Correspondingly, the pilot perceives a strong reactive force occurring upon limited movements of the control column which are close to the neutral position. Compare FIGS. 12 and 15.

The apparatus 270 of FIG. 16 enables simulation of the entire range of control reactions perceived by a pilot while manipulating the control column fore and aft for changing the pitch attitudes of an airplane operating in the range extending from a standstill condition to flying through a full range of airspeeds. The apparatus comprising a linkage system employing springs to provide reactive forces which simulate the effect of air flow pressure upon the elevator control surfaces and a movable and adjustably positioned fulcrum to provide the effect of varying airspeeds of the airplane.

Referring to FIG. 16, the control wheel 30 is secured to the control column 31 which in turn is slideably and rotatably received in the pilot's console. Slide bearings 272 support the control column 31 in the console and enable the control wheel and control column to be moved fore and aft while at the same time enabling the column to be rotated. The control column includes a depending flange 274 which is pivotably connected by a pin 276 to one end of a link 278. The other end of the link 278 is connected to adjacent ends of fore and aft tension springs 280, 281 which extend transversely with respect to the longitudinal axis of the link. The oppositely disposed ends of the tension springs are secured to spaced locations on the frame of the pilot's console. Disposed between the pivot connection of the link 278 to the control column 31 and the connection of the springs 280, 281 to the link is a fulcrum 283 which is movable and adjustably positionable along the length of the link. The movable fulcrum 283 comprises a slide bearing 285 adapted to move along the length of the link 278 and a fulcrum bracket 287 pivotably connected to the slide bearing 285 at one end thereof. The slide bearing 285 permits the control column 31 to be rotated. The other end of the brackets 287 engages a track on the frame of the pilot's console and is slideably movable therealong. A screw shaft 289 a linear motor 291 is threadedly connected to the base of the fulcrum bracket 287. The linear motor is coupled to and controlled by the computer 24.

In operation, movement of the control column in the aft direction (to the left in FIG. 16) causes the link 278 to pivot to the left (counter clockwise) about the movable fulcrum 283. Movement of the control column in a forward direction causes the link 278 to pivot to the right (clockwise) about the movable fulcrum 283. Motor 291 coupled to the fulcrum bracket moves the fulcrum bracket along the length of the link 278 in response to signals from the computer. When the movable fulcrum 283 is in the lower solid line position illustrated in FIG. 16, the fulcrum bracket 283 is located further from the pivot joint of the link 278 to the control column and closer to the connection of the link 278 to the tension springs. Accordingly, the link and fulcrum bracket provide a high mechanical advantage to the control column with the result that the control column can be moved through a relatively large distance with the application of a low force. In the upper dotted line position of the moving fulcrum bracket 283, the fulcrum bracket is located further away from the tension springs 280, 281. Accordingly, the mechanical advantage is reduced and greater force is required to move the control column. Thus, it can be seen that the distance between the fulcrum bracket and the ends of the link 278 form lever arms, the ratio of the lengths thereof detemining the mechanical advantage of the apparatus.

The lower solid line position of the movable fulcrum bracket represents a low air speed setting where the control column must be moved a greater distance against a relatively lower force in order to move the elevators a greater distance. The upper dotted line fulcrum bracket position represents a high air speed setting in which the elevators must be moved a relatively small distance while overcoming a greater force.

The diagrams of FIGS. 17-20 illustrate the operating principle of the link and fulcrum bracket apparatus 270.

FIG. 17 shows the link 278 and control column 31 maintained in a neutral position by the equal and opposite forces of the two tension springs 280, 281. Each spring represents the air pressure exerted on the elevator control surface, the right spring 281 representing the pressure bearing upon the bottom surface and the left spring 280 representing the pressure bearing on the top surface. As long as the control column is not moved along its longitudinal axis, the springs will hold the mechanism in the neutral state. This is similar to the action of the control column of an aircraft being flown level with the control wheel unrestrained (FIG. 17). Moving the fulcrum bracket 283 along the link 278 to change the position of the fulcrum bracket and link arm ratio, which is equivalent to changing the airspeed of the aircraft, will not effect the neutral, unrestrained equilbrium, thereby simulating the feel of the elevator control with changing airspeed of an aircraft in level flight.

FIG. 18 shows the control column 31 moved fully aft to an end stop, with the fulcrum bracket 283 positioned along the link 278 at a point representing zero airspeed or standstill. The fore spring 280 has been expanded by the link while the aft spring 281 has been compressed. Because of the fulcrum's position, the fore 280 spring is expanded just slightly, but not sufficiently to increase its tension significantly. Consequently, the pilot will not perceive any resistance to his movement of the control column throughout its entire range. The lack of reaction sensed by the pilot manipulating the link mechanism 270 is similar to the lack of reaction detected by a pilot handling the elevator control of an aircraft at standstill, as illustrated in FIG. 13.

FIG. 19 shows the control column 31 moved aft with the fulcrum bracket 283 positioned along the link 278 at a point representing low airspeed. In this position of the fulcrum bracket, the fore spring 280 has been expanded sufficiently to increase its tension significantly and provide resistance to movement of the control column. This reaction from the increased tension of the spring is similar to the restraint perceived by a pilot operating an aircraft at low airspeed while changing the pitch attitude, as illustrated in FIG. 14.

FIG. 20 shows the control column 31 moved aft with the fulcrum bracket 283 placed along the link 278 at a point representing high air speed. The fore spring 280 is expanded to the same length and develops the same tension force as in the FIG. 19 configuration, but due to the arm ratio of the link 278 provided by the position of the fulcrum bracket, and the resulting mechanical advantage, different from that of FIG. 19, the pilot senses the same reactive force for a much lesser displacement of the control column. This reactive force and its relative position of occurrence is similar to the restraint felt by a pilot when maneuvering an aircraft through a pitch change at high airspeed, as illustrated in FIG. 15.

Ailerons are also subject to rective forces caused by air flow over their surfaces. FIGS. 21-24 illustrate the relative positions of the ailerons and the control wheel for different flight conditions.

FIG. 21 shows the self-alignment, neutral position of the ailerons 285 and the control wheel 30 for level flight with the control wheel unrestrained.

FIG. 22 shows the control wheel 30 both turned fully to the left and to the right (dashed view) and the corresponding aileron positions for a standstill condition. Since air pressure is not generated at standsitll, there is an absence of externally applied forces on the ailerons. Consequently, at standstill, the pilot does not encounter reactive forces while turning the control wheel throught its entire range, in either direction.

In flight, air flow over the ailerons restrains their movements. The pilot perceives such restraints as reactive forces increasing in intensity upon turning the control wheel in either direction away from the neutral position. In addition, the pilot perceives a change in the intensity with a change in airspeed for any common position of the control wheel. At low airspeeds, a relatively large amount of turning is required to maneuver an aircraft through a certain rate of roll, as shown in FIG. 23.

At high airspeed (FIG. 24), a relatively limited movement of the control wheel will induce a rate of roll which corresponds to that for a greater movement of the control wheel at a lower airspeed. Correspondingly, the pilot perceives a given level of reactive force for a more limited movement of the control wheel at a greater airspeed as compared to the same level for a greater movement of the control wheel at lower airspeed.

An apparatus 300 (FIG. 25) similar to the link 278 apparatus of FIG. 16 provides simulation of the range of control reactions sensed by a pilot when moving the control wheel for varying the roll attitude of an aircraft when operating from standstill to flying through its full range of airspeeds. The apparatus utilizes springs to simulate the effect of airflow pressure bearing upon the aileron control surfaces, and a movable fulcrum to provide the effect of varying airspeeds, as does the apparatus of FIG. 16.

Referring to FIG. 25, a drive sprocket 302 is secured to the control column 31 to rotate therewith. As described in connection with FIG. 16, the control column is slideably supported in the pilot's console and can slide through sprocket 302. An idler sprocket 304 is spaced from the drive sprocket 302 and is coupled thereto by an endless chain 306. The idler sprocket is rotatably supported in the frame of the pilot's console. A coupling 308 is coupled to the endless chain 306 to move therewith between the drive sprocket and the idler sprocket. One end of the link 278a which is identical to link 278 described in connection with FIG. 16 is pivotably connected to the coupling 308. The other end of the link 278a is secured to left and right tension springs 280a, 281a similar to those described in connection with FIG. 16. A movable fulcrum bracket 283a similar to the one described in connection with FIG. 16 is slideably secured to the link 278a.

In operation, rotation of the control wheel 30 causes the control column 31 to rotate, which in turn rotates the drive sprocket 302 to move the chain 306 and the coupling 308. Movement of the coupling 308 pivots the cantilever bar 278a in a manner similar to that resulting from movement of the control column in a fore and aft direction, i.e. movement of the link 278 in apparatus 270 as described in connection with FIG. 16. The computer controls the position of the movable fulcrum to provide a variable resistance to rotating the control wheel left or right. The cantilever apparatus 300 of FIG. 25 is generally similar to the cantilever apparatus 270 of FIG. 16 except that rotation of the control wheel causes pivoting of the cantilever bar as opposed to the fore and aft movement of the control column.

The diagrams of FIGS. 26–29 illustrate the operating principle of the cantilever apparatus 300.

Figure 26:
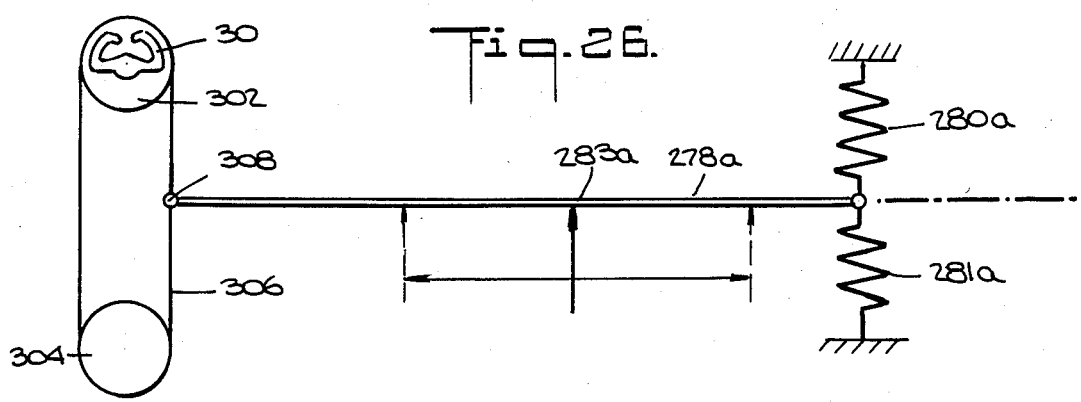
FIGS. 26-29 are schematic diagrams of the apparatus of FIG. 25 depicting different operating positions of the apparatus.

FIG. 26 shows the link 278a and control wheel 30 maintained in a neutral position by the equal and opposite tensions of the two tension springs 280a, 281a. Each spring represents the air flow pressure exerted on the aileron control surface, the right spring 281a representing the pressure bearing upon the bottom surface and the left spring 280a representing the pressure bearing on the top surface. As long as the control wheel is not turned, the springs hold the mechanism in the neutral state. This is similar to the action of the control wheel of an aircraft being flown in level flight with the control wheel unrestrained (FIG. 21). Moving the fulcrum bracket 283a along the link 278a to change the position of the fulcrum bracket and the lever arm ratio of link 278a, which is equivalent to changing the airspeed of the aircraft, will not affect the neutral, unrestrained equilibrium, thereby simulating the performance of the aileron controls with changing airspeed of an aircraft in level flight.

Figure 27:
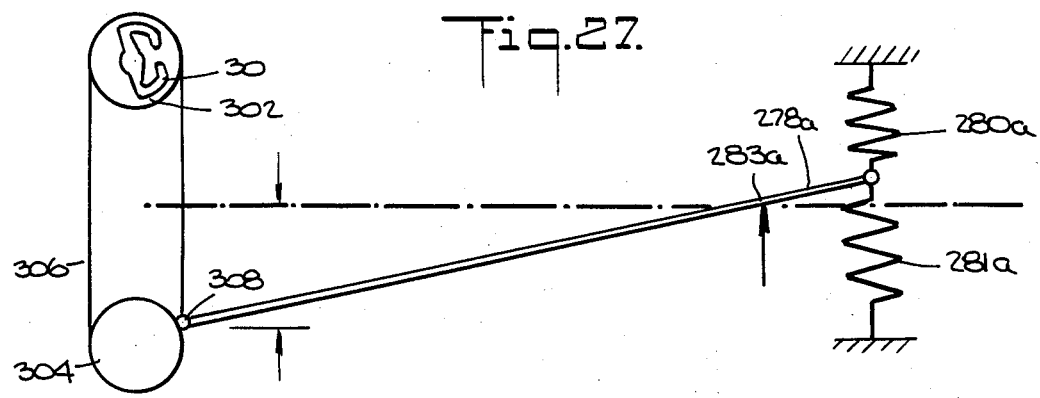

FIG. 27 shows the control wheel 30 turned fully to the left (counter clockwise) end stop, with the fulcrum bracket 283a position along the link 278a at a point representing zero airspeed or standstill. The left spring 281a is expanded by the link 278a while the right spring 280a is contracted. Because of the fulcrum bracket's position, the left spring is expanded slightly, but not enough to increase its tension significantly. Consequently, the pilot does not perceive any resistance to his rotating the control wheel throughout its entire range. The lack of the reaction sensed by the pilot manipulating the link mechanism is similar to the lack of reaction detected by a pilot upon moving the aileron control of an aircraft at standstill, as illustrated in FIG. 22.

Figure 28:
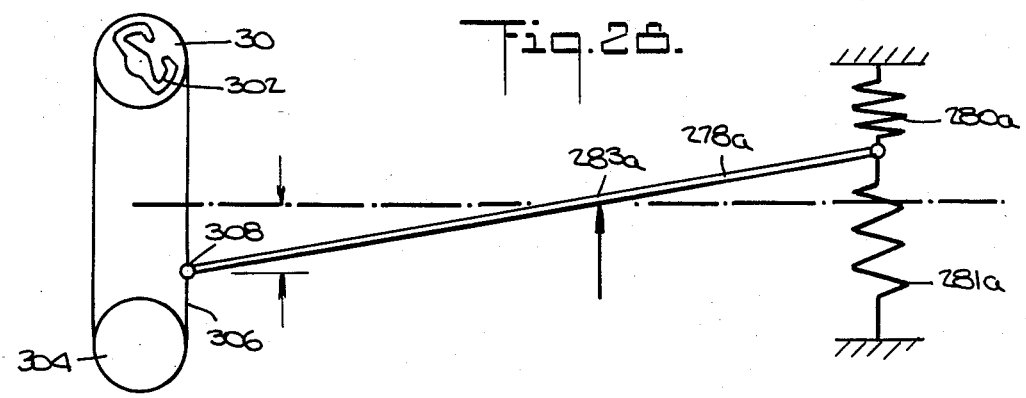

FIG. 28 shows the control wheel 30 turned to the left with the fulcrum bracket 283a positioned along the link 278a at a point representing low airspeed. In this position of the fulcrum bracket 283a the left spring 281a is expanded sufficiently to increase its tension and provide a resistance to rotation of the control wheel. This reaction from the increased tension of the spring is similar to the restraint sensed by a pilot operating an aircraft at low airspeed while changing the altitude as illustrated in FIG. 23.

Figure 29:
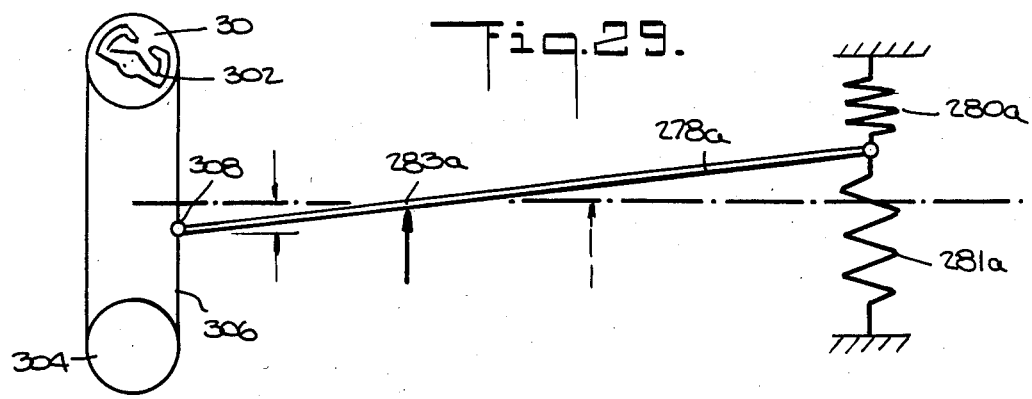

FIG. 29 shows the control wheel 30 turned left with the fulcrum bracket 283a placed along the cantilever at a point representing high airspeed. The left spring 281a is expanded to the same length and develops the same tension force as in FIG. 28. Since the lever arm ratio of the line 278a provided by the position of the fulcrum bracket, and consequently the mechanial advantage, differ from those of FIG. 28, the pilot senses the same reactive force for a more limited rotation of the control wheel. This reactive force and its relative position of occurrence is similar to the restraint felt by a pilot upon maneuvering an aircraft through an altitude change at a high airspeed as illustrated in FIG. 24.

The rudder pedals are coupled to an apparatus comprising a linkage system simulator to that of apparatus 270 shown in FIG. 16. Such a linkage system includes springs to provide reactive forces and a movable fulcrum similar to those of the apparatus of FIG. 16 and therefore will not be described further.

The advantages of the present invention, as well as certain changes and modifications of the disclosd embodiemtns thereof, will be readily apparent to those skilled in the art. It is the applicant's intention to cover their claims all those changes and modifications which could be made to the embodiments of the invention herein chosen for the purposes of the disclosure without departing from the spirit and scope of the invention.

What is claimed is:

1. Apparatus for simulating a moveable control for a system in which force and movement parameters of the control can be varied in accordance with simulated operation of the system, comprising:
a movable control element;
a lever apparatus including a lever having first and second ends, means for pivoting the lever at a fulcrum point adjustably positioned between the first and second ends, and means coupled to the second end of the lever for applying a centering force to the lever to resist pivoting of the lever from a neutral position, the centering force being a predetermined function of displacement of the lever from the neutral position;
means for coupling the first end of the lever to the control element for moving the first end of the lever to pivot the lever in response to movement of the control element; and means adapted to be coupled to a control means which is responsive to conditions to be simulated during operation of the system for positioning the pivoting means to any one of a plurality of adjustable points between the first and second ends of the lever to change the fulcrum point of the lever and thereby the mechanical advantage of the first end of the lever with respect to the second end of the lever such that the force required at the first end of the lever for a given displacement of the first end of the lever against the centering force at the second end of the lever can be varied, whereby the force required to move the control element over a given distance can be varied to simulate the feel of operating the system.

2. Apparatus in accordance with claim 1, wherein the movable control element is rotatably mounted and the coupling means couples the first end of the lever to the control element for moving the first end of the lever in response to rotation of the control element.

3. Apparatus in accordance with claim 1, wherein the movable control element is generally linearly movable and the coupling means couples the first end of the lever to the linearly movable control element for moving the first end of the lever in response to linear movement of the control element.

4. Apparatus in accordance with claim 3, wherein the coupling means comprises means for pivotally connecting the first end of the lever to the control element.

5. Apparatus in accordance with claim 2 or 3, wherein the control element is rotatable and generally linearly movable, a said lever apparatus being provided to pivot in response to rotation of the control element and a said lever apparatus being provided to pivot in response to said linear movement of the control element, the coupling means coupling the control element to each lever apparatus.

6. Apparatus in accordance with claim 1, wherein the resisting means comprises spring means connected to the second end of the lever to resist pivotal movement thereof.

7. Apparatus in accordance with claim 6, wherein the spring means comprises a first spring having one end connected to the second end of the lever and another end fixed at a point spaced from the second end of the lever and which point is located in a direction of movement of the second end of the lever, and a second spring having one end connected to the second end of the lever and another end fixed at a point spaced from the second end of the lever and which point is located in another direction of movement of the lever opposite to said one direction.

8. Method for simulating a movable control for a system in which force and movement parameters for the control can be varied in accordance with simulated operation of the system, the system having a movable control element and a lever apparatus including a lever having first and second ends, the method comprising the steps of:

pivoting the lever at a fulcrum point adjustably positioned between the first and second ends of the lever, applying a centering force to the second end of the lever to resist pivoting of the lever from a neutral position, the centering force being a predetermined function of the displacement of the lever from a neutral position, coupling the first end of the lever to the control element for moving the first end of the lever to pivot the lever in response to movement of the control element; and positioning the fulcrum point of the lever to any one of a plurality of selectable locations between the first and second ends of the lever to change the fulcrum point of the lever and thereby the the mechanical advantage of the first end of the lever with respect to the second end of the lever such that the force required at the first end of the lever for a given displacement of the first end of the lever against the centering force at the second end of the lever can be varied, the positioning of the fulcrum point being in response to conditions to be simulated during operation of the system, whereby the force required to move the control element over a given distance can be varied to simulate the feel of operating the system.

9. Apparatus in accordance with claim 8 in which the movable control element is rotatably mounted and the step of coupling the first end of the lever to the control element causes the first end of the lever to rotate in response to rotation of the control element.

10. A method in accordance with claim 8 in which the movable control element is linearly movable and in which the step of coupling the first end of the lever to the control element causes the first end of the lever to move in response to linear movement of the control element.

11. Apparatus for simulating a movable control for a system in which force and movement parameters of the control can be varied in accordance with simulated operation of the system, comprising:

a rotatably mounted control element;

a lever apparatus including a lever having first and second ends, means for pivoting the lever at a point adjustably positioned between the first and second ends, and means coupled to the second end of the lever for resisting pivoting of the lever;

means for coupling the first end of the lever to the control element for moving the first end of the lever to pivot the lever in response to rotation of the control element, the coupling means comprising a first wheel connected to the control element to rotate therewith, an endless element connected to the first end of the lever which extends about the first wheel and is driven by the first wheel, a second wheel spaced from the first wheel and fixed thereat, the endless element extending about the second wheel to enable the endless element to move in response to rotation of the first wheel; and means adapted to be coupled to a control means which is responsive to conditions to be simulated during operation of the system for positioning the pivot means to any one of a plurality of adjustable points between the first and second ends of the lever to change the fulcrum of the lever and thereby the force and distance relationship at the ends of the lever, whereby the force required to move the control element over a given distance can be varied to simulate the force of operating the system.

12. Apparatus in accordance with claim 11, wherein the second wheel is rotatably mounted and rotates in response to movement of the endless element.

13. Apparatus in accordance with claim 12, wherein the first and second wheels are sprocket wheels and the endless element is a chain.

14. Apparatus in accordance with claim 11, wherein the coupling means includes a bracket secured as part of the endless element to move therewith and pivot means for pivotally connecting the first end of the lever thereto.

15. Apparatus for simulating a movable control for a system in which force and movement parameters of the control can be varied in accordance with simulated operation of the system, comprising:

a movable control element;

a lever apparatus including a lever having first and second ends, means for pivoting the lever at a point adjustably positioned between the first and second ends including a slide bearing slidably movable along the lever and a bracket pivotally connected to the slide bearing, and means coupled to the second end of the lever for resisting pivoting of the lever;

means for coupling the first end of the lever to the control element for moving the first end of the lever to pivot the lever in response to movement of the control element; and means adapted to be coupled to a control means which is responsive to conditions to be simulated during operation of the system for positioning the bracket to any one of a plurlity of adjustable points between the first and second ends of the lever to change the fulcrum of the lever and thereby the force and distance relationship at the ends of the lever, whereby the force required to move the control element over a given distance can be varied to simulate the force of operating the system.

* * * * *

UNITED STATES PATENT AND TRADEMARK OFFICE
CERTIFICATE OF CORRECTION

PATENT NO. : 4,599,070
DATED : July 8, 1986
INVENTOR(S) : Walter Hladky, et al.

Figure 2:
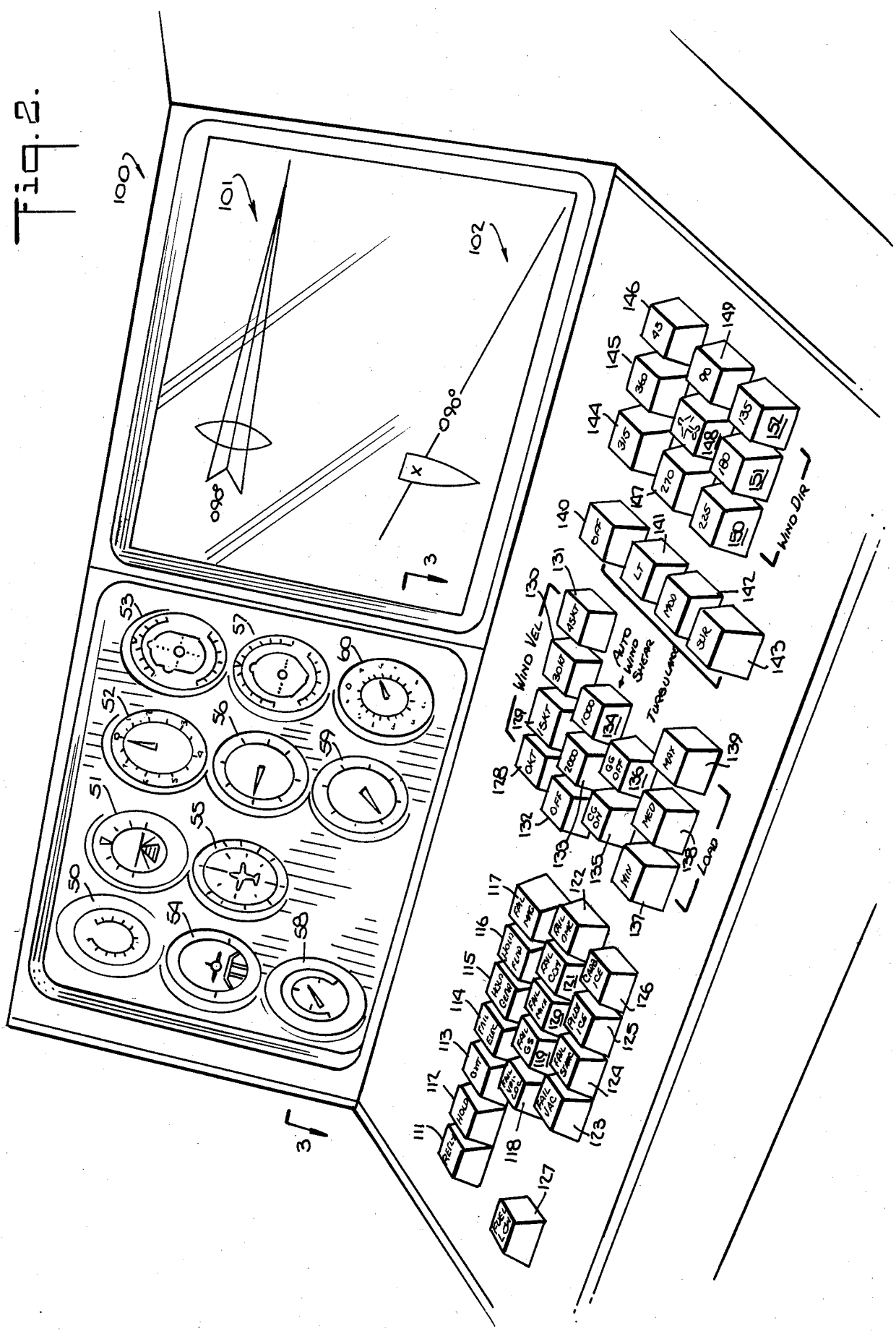
FIG. 2 is an enlarged perspective view of the instructor's console of FIG. 1.

It is certified that error appears in the above—identified patent and that said Letters Patent is hereby corrected as shown below:

Column 4, line 52, delete "of" and insert --or--;

Column 5, line 8, delete "FIG. 3" and insert --FIG. 2--;

Column 7, line 7, delete "Transeivers" and insert --Transceivers--;

Column 8, line 8, delete "eqipment" and insert --equipment--;

Column 9, line 5, delete "as, and" and insert --as--;

Column 10, line 26, delete "form" and insert --formed--;

Column 10, line 58, delete "liquied" and insert --liquid--;

Column 12, line 11, delete "a RF" and insert --an RF--;

Column 12, line 22, delete "ow" and insert --now--;

Column 12, line 26, delete "and" , first occurrence, and insert -- an --.

Column 12, line 60, delete "exitation" and insert --excitation--;

Column 14, line 27, delete "give" and insert --given--;

Column 16, line 6, delete "280 spring" and insert --spring 280--;

UNITED STATES PATENT AND TRADEMARK OFFICE
CERTIFICATE OF CORRECTION

PATENT NO. : 4,599,070

DATED : July 8, 1986

INVENTOR(S) : Walter Hladky, et al.

It is certified that error appears in the above—identified patent and that said Letters Patent is hereby corrected as shown below:

Column 16, line 48, delete "standsitll" and insert --standstill--;

Column 16, line 52, delete "throught" and insert --throughout--;

Column 18, line 3, delete "position" and insert --positioned--;

Column 18, line 46, delete "embodiemtns-- and insert --embodiments--;

Column 18, line 48, insert --by-- before "their";

Column 18, line 53, delete "moveable" and insert --movable--;

Column 20, line 10, delete "the" in second occurrence;

Column 22, line 11, delete "plurlity" and insert --plurality--.

Column 22, line 11, "bracket" should read -- pivot means --.

Signed and Sealed this

Sixth Day of January, 1987

Attest:

DONALD J. QUIGG

Attesting Officer

Commissioner of Patents and Trademarks